US010535128B2

(12) United States Patent
Fukushima et al.

(10) Patent No.: US 10,535,128 B2
(45) Date of Patent: Jan. 14, 2020

(54) DISPLAY DEVICE, THREE-DIMENSIONAL IMAGE DATA CREATION DEVICE, AND COMPUTER-READABLE STORAGE MEDIUM

(71) Applicant: CASIO COMPUTER CO., LTD., Tokyo (JP)

(72) Inventors: Takayuki Fukushima, Tokyo (JP); Satoshi Kurosawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 195 days.

(21) Appl. No.: 15/842,657

(22) Filed: Dec. 14, 2017

(65) Prior Publication Data

US 2018/0174289 A1 Jun. 21, 2018

(30) Foreign Application Priority Data

Dec. 16, 2016 (JP) ................................. 2016-244887
Aug. 30, 2017 (JP) ................................. 2017-165680

(51) Int. Cl.
*G06K 9/00* (2006.01)
*G06T 7/00* (2017.01)
(Continued)

(52) U.S. Cl.
CPC ............ *G06T 7/0002* (2013.01); *B33Y 50/00* (2014.12); *G06T 7/90* (2017.01); *B29C 44/022* (2013.01);
(Continued)

(58) Field of Classification Search
CPC . H01L 2224/32225; H01L 2224/48227; H01L 2224/73265; H01L 2924/00; H01L 2924/00014
(Continued)

(56) References Cited

U.S. PATENT DOCUMENTS 9,469,135 B2 * 10/2016 Weijkamp ............. B29C 64/112

FOREIGN PATENT DOCUMENTS

JP  S64-28660 A   1/1989
JP  2001-150812 A  6/2001

OTHER PUBLICATIONS

Japanese Office Action dated Dec. 4, 2018 in a counterpart Japanese patent application No. 2017-165680. (A machine translation (not reviewed for accuracy) attached.).

* cited by examiner

*Primary Examiner* — Charlotte M Baker
(74) *Attorney, Agent, or Firm* — Chen Yoshimura LLP

(57) ABSTRACT

A three-dimensional image data reviewing device includes a processor that obtains first distension data for causing a thermally distensible layer of a thermally distensible sheet to distend from one of a front surface and a rear surface of the thermally distensible sheet and that obtains second distension data for causing the thermally distensible layer to distend from another of the front surface and the rear surface, a display unit connected to the processor, wherein the processor causes the display unit to display, on a preview screen, an appearance of the thermally distensible sheet after the thermally distensible layer is caused to distend in accordance with the first distension data and the second distension data, the processor also causing the display unit to identifiably display, in a prescribed manner, an abnormal region of the thermally distensible layer where the thermally distensible layer is predicted to distend abnormally.

14 Claims, 29 Drawing Sheets

(51) Int. Cl.
  *G06T 7/90*   (2017.01)
  *B33Y 50/00*   (2015.01)
  *B29K 105/04*  (2006.01)
  *B29C 44/60*   (2006.01)
  *B29C 44/02*   (2006.01)
  *B29C 44/04*   (2006.01)

(52) U.S. Cl.
  CPC .............. *B29C 44/04* (2013.01); *B29C 44/60* (2013.01); *B29K 2105/04* (2013.01); *G06T 2207/10024* (2013.01)

(58) Field of Classification Search
  USPC ........................................................ 382/154
  See application file for complete search history.

DISPLAY DEVICE, THREE-DIMENSIONAL IMAGE DATA CREATION DEVICE, AND COMPUTER-READABLE STORAGE MEDIUM

BACKGROUND OF THE INVENTION

Field of the Invention

The present invention relates to a display device, a three-dimensional image data creation device, and a computer-readable storage medium.

Description of the Related Art

One conventional method of forming three-dimensional objects involves forming (by printing) an electromagnetic wave heat conversion layer that converts electromagnetic waves to heat on a medium (a thermally distensible sheet (thermal foaming sheet), for example) including on one surface thereof a thermally distensible layer (foaming layer) that distends in accordance with the amount of heat absorbed, and then irradiating the portion of the thermally distensible layer (foaming layer) where the electromagnetic wave heat conversion layer is formed on the medium with electromagnetic waves in order to make that portion distend and rise up (see Patent Documents 1 and 2, for example). Below, a system for forming this type of three-dimensional object will be referred to as a 2.5D printer system.

As the thermally distensible layer of the thermally distensible sheet rises up due to distension, protrusions and recesses are formed in the surface of the thermally distensible sheet. By using these types of bumps in the thermally distensible layer to create protrusion shapes or protrusion and recess shapes, a three-dimensional object is formed on the thermally distensible sheet.

In patent documents Japanese Patent Application Laid-Open Publication No. S64-28660 and Japanese Patent Application Laid-Open Publication No. 2001-150812, a grayscale image (electromagnetic wave heat conversion layer) that converts electromagnetic waves to heat is formed on the rear surface of a thermally distensible sheet (thermal foaming sheet), and then the thermally distensible sheet (thermal foaming sheet) is irradiated with light from the rear surface side. However, when heat is applied to the distension layer through the base material of the thermally distensible sheet (thermal foaming sheet), the base material diffuses the heat, and therefore fine patterns cannot be formed.

Therefore, methods of forming a fine pattern on the front surface of a thermally distensible sheet (thermal foaming sheet), forming a rough pattern on the rear surface, and then respectively irradiating both the front surface and the rear surface of the thermally distensible sheet (thermal foaming sheet) with light were invented. When the front surface is irradiated with light, the heat is applied directly to the distension layer without passing through the base material, and therefore the heat does not diffuse. This makes it possible to form three-dimensional objects having fine patterns.

SUMMARY OF THE INVENTION

In recent years, it has been conceived to use this type of three-dimensional object formation system in order to form surface materials for various products. Conventional content to be formed on thermally distensible sheets (thermal foaming sheets) has been provided by manufacturers.

Therefore, although it is likely that manufacturers will similarly provide content for surface materials, it is even more desirable that users be able to create their own three-dimensional objects for surface materials.

When users create three-dimensional objects by themselves, it is necessary to repeatedly create and test-print content. However, because it takes a prescribed amount of time to form each three-dimensional object, repeatedly test-printing the content requires an even larger amount of time.

Furthermore, when users create three-dimensional objects by themselves, it is necessary to sufficiently understand the properties of the thermally distensible sheet (thermal foaming sheet) and avoid abnormal distension (abnormal foaming). Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a three-dimensional image data reviewing device, including: a processor that obtains first distension data for causing a thermally distensible layer of a thermally distensible sheet to distend from one of a front surface and a rear surface of the thermally distensible sheet and that obtains second distension data for causing the thermally distensible layer to distend from another of the front surface and the rear surface of the thermally distensible sheet, and a display unit connected to the processor, wherein the processor causes the display unit to display, on a preview screen, an appearance of the thermally distensible sheet after the thermally distensible layer is caused to distend in accordance with the first distension data and the second distension data, the processor also causing the display unit to identifiably display, in a prescribed manner, an abnormal region of the thermally distensible layer where the thermally distensible layer is predicted to distend abnormally.

In another aspect, the present disclosure provides a three-dimensional image data creation device, including: a processor that receives image data having prescribed gradation levels and allocates the image data into a plurality of density layers that, when printed on a thermally distensible sheet, respectively cause a thermally distensible layer of the thermally distensible sheet to distend to different respective distension heights, the processor generating distension data by combining the plurality of density layers and determining whether abnormal distension will occur in the thermally distensible sheet including the thermally distensible layer, the processor outputting the determination result.

In another aspect, the present disclosure provides a computer-readable non-transitory storage medium having stored thereon a program executable by a computer, the program causing the computer, which controls a three-dimensional image data creation device, to perform the following: dividing image data having prescribed gradation levels into a plurality of density layers that, when printed on a thermally distensible sheet, respectively cause a thermally distensible layer of the thermally distensible sheet to distend from one of a front surface and a rear surface of the thermally distensible sheet to different respective distension heights, on the basis of gradation values at each pixel, the plurality of density layers being fewer in number than the prescribed gradation levels of the image data; generating distention data by combining the plurality of density layers; determining, from the distension data, whether abnormal distension will occur in the thermally distensible sheet having the thermally distensible layer; moving at least one region of a density layer among the plurality of density layers to a density layer that causes the thermally distensible layer of the thermally distensible sheet to distend from another of the front surface and the rear surface of the thermally distensible sheet; and thereafter, reevaluating whether the abnormal distension will occur.

It is to be understood that both the foregoing general description and the following detailed description are exemplary and explanatory, and are intended to provide further explanation of the invention as claimed.

DETAILED DESCRIPTION OF EMBODIMENTS

Embodiments of the present invention will be described in detail below with reference to figures.

In the present embodiment, "three-dimensional object" refers to a model object, where such a model object can include a wide range of shapes such as simple shapes, geometric shapes, and characters. Such model objects can also include decorations formed as a result of decoration. Here, "decorations" refers to objects that appeal to the aesthetic senses visually and/or haptically. Moreover, "forming a three-dimensional object" refers not only to forming a model object itself but also to decorating objects.

The present embodiment relates to a method of forming three-dimensional images by printing a desired image with a black ink or the like containing a material (an electromagnetic wave heat conversion material such as carbon, for example) that converts electromagnetic waves to heat on a medium (a thermally distensible sheet (thermal foaming sheet), for example) including on one surface thereof a thermally distensible layer (foaming layer) that distends in accordance with the amount of heat absorbed, and then irradiating the portion of the thermally distensible layer where the image is formed on the medium with electromagnetic waves in order to make that portion distend and rise up. Here, "electromagnetic waves" refers to near-infrared light, visible light, or the like, for example, but is not limited to these examples.

Figure 1:
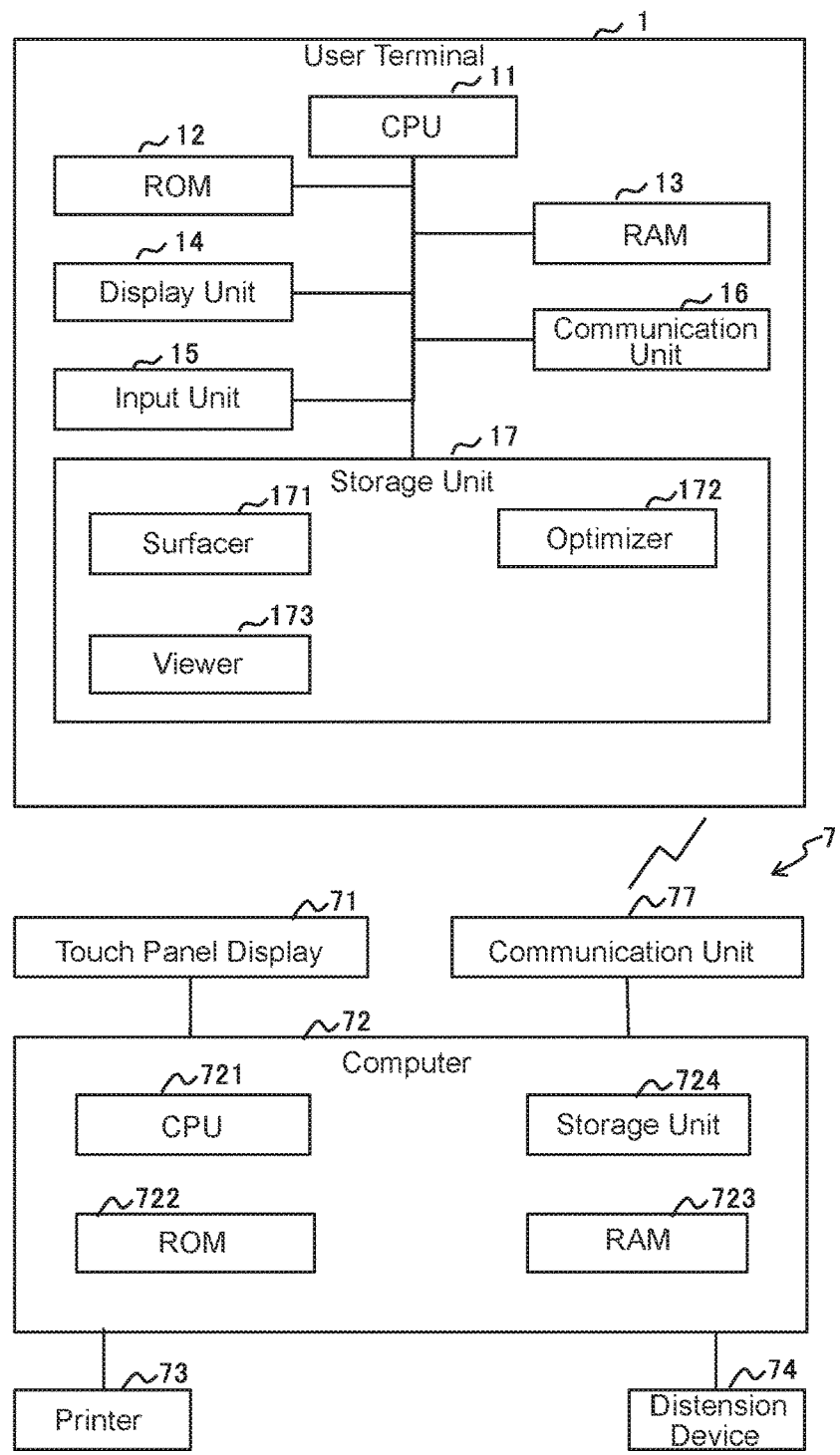
FIG. 1 is a block diagram schematically illustrating a three-dimensional object formation system according to an embodiment.

FIG. 1 is a block diagram schematically illustrating a three-dimensional object formation system according to the present embodiment.

A user terminal 1 includes a central processing unit (CPU) 11, a read-only memory (ROM) 12, a random-access memory (RAM) 13, a display unit 14, an input unit 15, a communication unit 16, and a storage unit 17. The storage unit 17 stores software programs such as a surfacer 171, an optimizer 172, and a viewer 173. Of these, the optimizer 172 and the viewer 173 form a display program.

The display unit 14 includes a liquid crystal display panel and the like, for example. The input unit 15 includes a mouse, a touch panel, a keyboard, and the like and is used to operate the user terminal 1. Furthermore, the user terminal 1 is connected with a 2.5D (2.5-dimensional) printer system 7 via the communication unit 16 to enable bidirectional communication therebetween. The communication unit 16 is a Wi-Fi (registered trademark) wireless communication module, for example.

The surfacer 171 is a support software for extracting 2D source image data to create protrusion/recess patterns for three-dimensional objects and assists with configuring which areas should protrude and by how much. The surfacer 171 thus functions as 2.5D content generator software and makes it possible to easily create 2.5D content from 2D image data. The surfacer 171 of the present embodiment is a plug-in for use in image software (not illustrated in the figure) but is not limited to this example and may take the form of standalone application software or any other format.

The optimizer 172 filters content created using the surfacer 171 before that content is output to the 2.5D printer system 7. The optimizer 172 filters the content so that the user does not have to be particularly aware of factors such as the properties of the 2.5D printer system 7 and the thermally distensible sheet (thermal foaming) sheet. The details of this filtering process will be described in more detail later with reference to FIGS. 11 and 12.

More specifically, upon input of original content created with the surfacer 171, the optimizer 172 creates abnormal distension (abnormal foaming) warning data, replaces the affected data with optimized data, and also filters the content in accordance with the properties of the thermally distensible sheet.

Here, "abnormal distension" refers to separation of the thermally distensible layer from the base material and to distension beyond the target height levels due to separation of the bonds between a plurality of thermally distensible materials (thermally distensible microcapsules or micropowders) contained in the thermally distensible layer.

The viewer 173 displays the protruding portions of the protrusions and recesses included in a three-dimensional object. The viewer 173 renders the 2.5D content output by the optimizer 172 and uses a 3D rendering engine to display a preview of the appearance of the three-dimensional object that will be formed from this content. The viewer 173 also issues warnings of regions in which abnormal distension is predicted to occur. The viewer 173 is used to check content before output. Together, the optimizer 172 and the viewer 173 form the display program, which uses grayscale image data (bump data) to be printed on the thermally distensible sheet to display a preview of the appearance of the three-dimensional object on the user terminal 1.

The user terminal 1 functions as a display device for displaying the preview of the appearance of the three-dimensional object created from the grayscale image data (bump data) as the CPU 11 executes the optimizer 172 and the viewer 173.

A touch panel display 71, a printer 73, a distension device (foaming device) 74, and a communication unit 77 are connected to a computer 72 to configure the 2.5D printer system 7. The 2.5D printer system 7 prints carbon black to form a grayscale image on a thermally distensible sheet (described below) and then irradiates the thermally distensible sheet with near-infrared light or visible light to make the regions of the thermally distensible sheet where the carbon black is printed distend and thereby form a three-dimensional object. In the present embodiment, the thermally distensible sheet is a concept that is included in both paper and other mediums. Moreover, the 2.5D printer system 7 may be abbreviated as "2.5D printer" in the figures.

The computer 72 includes a CPU 721, a ROM 722, a RAM 723, and a storage unit 724 and controls the printer 73 and the distension device 74. The storage unit 724 stores content for forming three-dimensional objects on thermally distensible sheets.

The touch panel display 71 is formed by layering together a touch panel and a liquid crystal display panel and is used to operate the 2.5D printer system 7. Together, the computer 72 and the touch panel display 71 function as a display unit that displays operating procedure instructions for the printer 73 and the distension device 74. Furthermore, the computer 72 is connected with the user terminal 1 via the communication unit 77 to enable bidirectional communication therebetween. The communication unit 77 is a Wi-Fi (registered trademark) wireless communication module, for example.

The printer 73 is an inkjet printer and prints grayscale images in carbon black ink (a prescribed printing material) on the front surface and/or the rear surface of the thermally distensible sheet as a medium. Note that the printer 73 is not limited to an inkjet printer and may alternatively be a laser printer, and the prescribed printing material may be a combination of a toner and a developer.

The distension device 74 irradiates the thermally distensible sheet with visible light or near-infrared light while conveying the thermally distensible sheet through and thereby generate heat on the portions where the carbon black grayscale image (electromagnetic wave heat conversion layer) is formed. The distension device 74 includes a halogen heater and a conveyor (not illustrated in the figure), for example, and irradiates one surface of the thermally distensible sheet with light energy.

In a procedure for inserting the medium into the printer 73, the touch panel display 71 displays a guide screen showing how to insert the medium into the printer 73. This guide screen displays instructions including an image corresponding to the medium and an image corresponding to the 2.5D printer system 7.

In a procedure for inserting the medium into the distension device 74, the touch panel display 71 displays a guide screen showing how to insert the medium into the distension device 74. This guide screen displays instructions in which the positional relationship between the image corresponding to the medium and the image corresponding to the 2.5D printer system 7 is reversed relative to in the guide screen showing how to insert the medium into the printer 73.

Figure 2:
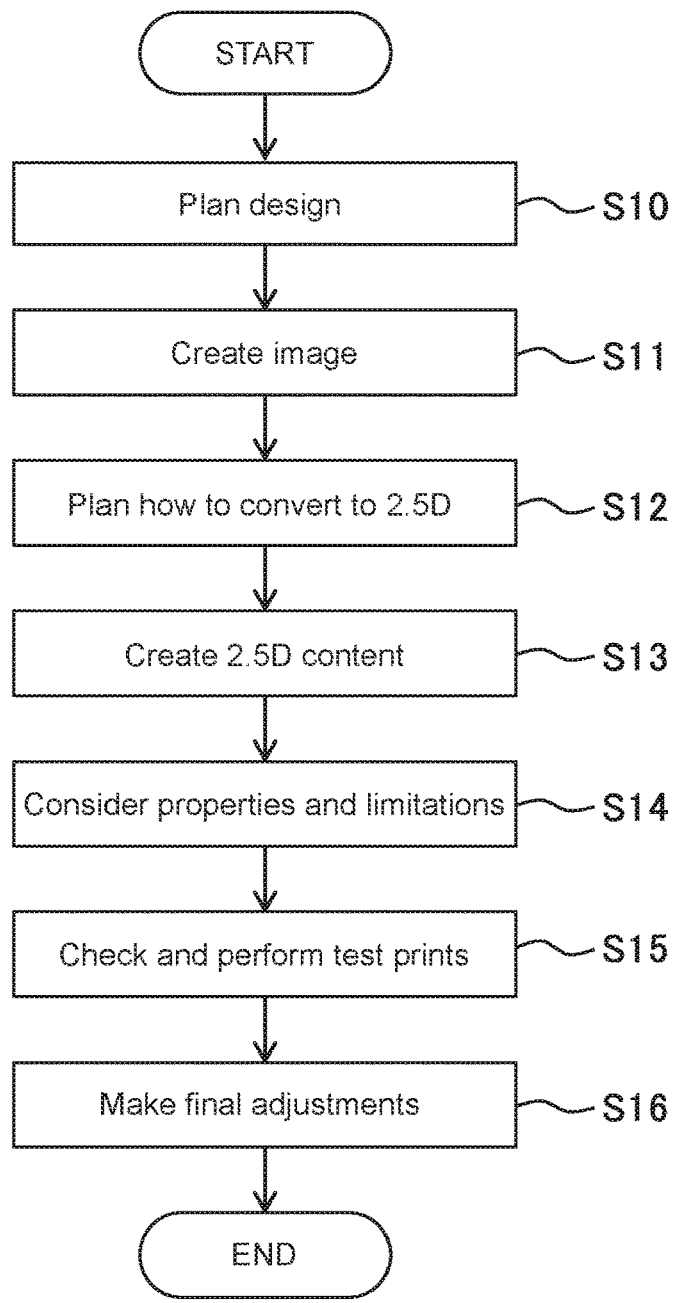
FIG. 2 is an example of a flowchart for when users create their own three-dimensional objects.

FIG. 2 is an example of a flowchart for when users create their own three-dimensional objects.

First, the user plans a design (step S10) and determines a theme for what to create. After deciding on a theme, the user creates a source image for the three-dimensional object (step S11) and then plans how to convert the created source image to 2.5D (step S12). To complete steps S10 to S12, the user uses paper and pencil, graphics software, map software, drawing software, or the like.

Next, the user creates 2.5D content (step S13). More specifically, the user creates the 2.5D content by converting a protrusion/recess design to a grayscale image. To complete this step, the user uses graphics software, drawing software, or the like. Then, the user considers the properties and limitations of the 2.5D printer system 7 (step S14), and the 2.5D content is optimized to avoid any potential issues. The optimizer 172 illustrated in FIG. 1 is responsible for executing this optimization process.

The user checks the created content by previewing the appearance with the viewer 173 and by performing test prints with the 2.5D printer system 7 (step S15). Then, while viewing the three-dimensional object to be formed from the created content, the user uses graphics software or drawing software or the like to make final adjustments to the protrusions and recesses (step S16). The processes in steps S15 and S16 are repeated as necessary. Upon determining that a sufficient degree of quality has been achieved, the user completes the three-dimensional object creation process.

Figure 3:
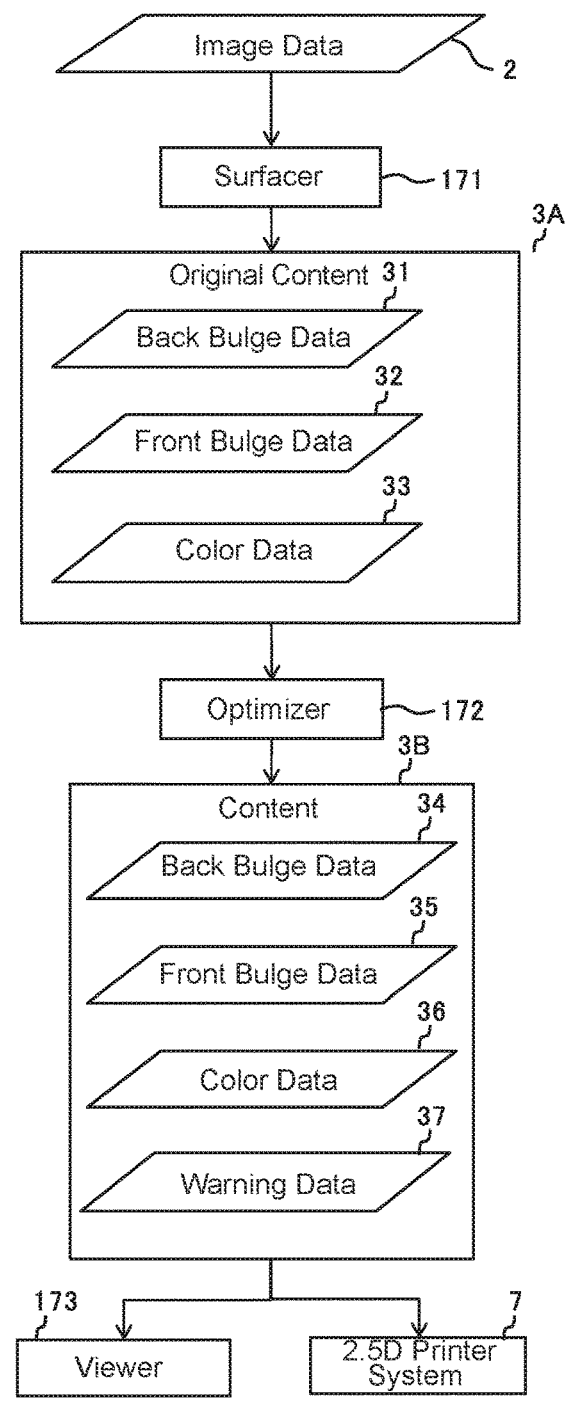
FIG. 3 is a diagram for explaining input/output data in a surfacer, an optimizer, a viewer, and a 2.5D printer.

FIG. 3 is a diagram for explaining input/output data in the surfacer 171, the optimizer 172, the viewer 173, and the 2.5D printer system 7.

The CPU 11 executes the surfacer 171 to create original content 3A from input image data 2. This original content 3A includes back bulge data 31, front bulge data 32, and color data 33.

The CPU 11 executes the optimizer 172 to create content 3B from the original content 3A that is input. This content 3B includes back bulge data 34, front bulge data 35, color data 36, and warning data 37.

The CPU 11 executes the viewer 173 to, on the basis of the content 3B that is input, display a preview of the three-dimensional object that will be formed from the content 3B.

The CPU 11 then transmits the content 3B to the 2.5D printer system 7, and the 2.5D printer system 7 prints the content 3B on a thermally distensible sheet and distends (foams) the sheet to form the three-dimensional object.

Figure 4:
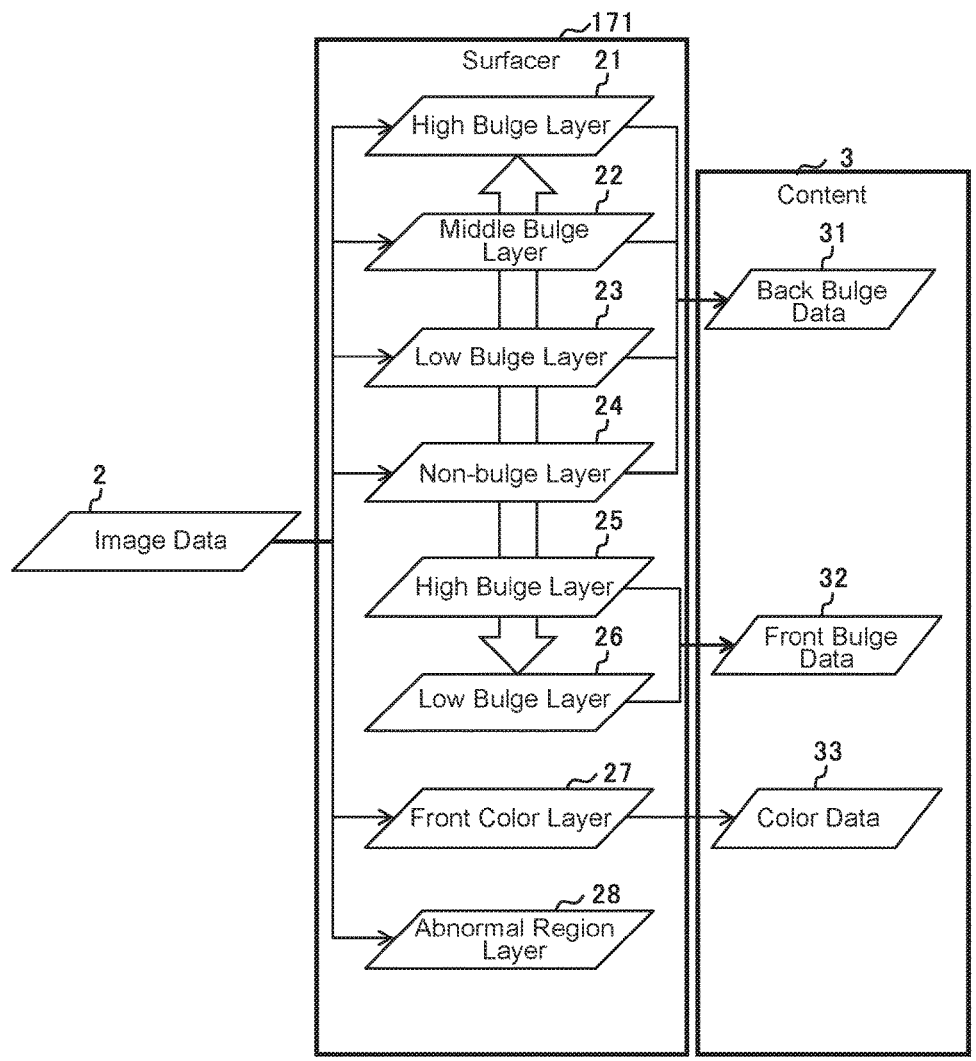
FIG. 4 is a diagram for explaining input data, internal data, and output data in the surfacer.

FIG. 4 is a diagram for explaining input data, internal data, and output data in the surfacer 171.

The input data for the surfacer 171 is the image data 2, and the output data is content 3 that includes the back bulge data 31, the front bulge data 32, and the color data 33. The image data 2 may be in any format, such as CMY JPEG or RGB BMP.

The CPU 11 executes the surfacer 171 to allocate the input image data 2 into a front color layer 27 and a back bulge layer set (back foaming layer set) that includes a high bulge layer 21, a middle bulge layer 22, a low bulge layer 23, and a non-bulge layer 24. This back bulge layer set is first distension data for making the thermally distensible layer distend (foam) from the rear surface of the thermally distensible sheet. The CPU 11 also identifies regions that will distend abnormally and creates an abnormal region layer 28.

When the CPU 11 executes the surfacer 171, the image data 2 is allocate into each layer of the back bulge layer set on the basis of the gradation values (brightness) of the image data 2. The CPU 11 assigns regions with a brightness of greater than 75% to the high bulge layer 21 and sets a density for these regions to 100% (black). Regions of the high bulge layer 21 to which none of the image data 2 is assigned are left transparent.

The CPU 11 assigns regions with a brightness of greater than 50% and less than or equal to 75% to the middle bulge layer 22 and sets the density for these regions to 66% (dark gray). Regions of the middle bulge layer 22 to which none of the image data 2 is assigned are left transparent.

The CPU 11 assigns regions with a brightness of greater than 25% and less than or equal to 50% to the low bulge layer 23 and sets the density for these regions to 33% (light gray). Regions of the low bulge layer 23 to which none of the image data 2 is assigned are left transparent.

The CPU 11 assigns regions with a brightness of less than or equal to 25% to the non-bulge layer 24 and sets the density for these regions to 0% (white). Regions of the non-bulge layer 24 to which none of the image data 2 is assigned are left transparent.

The regions in the high bulge layer 21, the regions in the middle bulge layer 22, the regions in the low bulge layer 23, and the regions in the non-bulge layer 24 are printed on the rear surface of the thermally distensible sheet in these different respective densities and therefore distend to different respective distension (foaming) heights when irradiated with light.

Thus, the CPU 11 allocates the image data 2 that includes prescribed gradation levels into any of four layers in accordance with the gradation value (brightness) at each coordinate and also sets a density corresponding to the assigned layer. This makes it possible to preview the distension data (foaming data) simply by combining and displaying the multiple layers.

Furthermore, when the CPU 11 executes the surfacer 171, a high bulge layer 25 and a low bulge layer 26 constituting a front bulge layer set (front foaming layer set) are prepared, and at least one of the regions from among the high bulge layer 21, the middle bulge layer 22, the low bulge layer 23, and the non-bulge layer 24 constituting the back bulge layer set can be moved back and forth therebetween. This front bulge layer set is second distension data for making the thermally distensible layer distend from the front surface of the thermally distensible sheet. The regions in the high bulge layer 25 and the regions in the low bulge layer 26 are printed on the front surface of the thermally distensible sheet in different respective densities and therefore distend to different respective distension heights when irradiated with light.

Upon receiving an output command, the CPU 11 combines the high bulge layer 21, the middle bulge layer 22, the low bulge layer 23, and the non-bulge layer 24 to create the back bulge data 31, which is mirror-reversed. The CPU 11 also combines the high bulge layer 25 and the low bulge layer 26 to create the front bulge data 32 and creates the color data 33 from the front color layer 27.

The high bulge layer 21, the middle bulge layer 22, the low bulge layer 23, and the non-bulge layer 24 are mirror-reversed with respect to the back bulge data 31. This makes it easy to grasp how the high bulge layer 21, the middle bulge layer 22, the low bulge layer 23, and the non-bulge layer 24 will correspond to regions on the front of the thermally distensible sheet. This also makes it possible to easily display the high bulge layer 21, the middle bulge layer 22, the low bulge layer 23, and the non-bulge layer 24 superimposed on the high bulge layer 25, the low bulge layer 26, and the front color layer 27 that will be printed on the front of the thermally distensible sheet.

Figure 5:
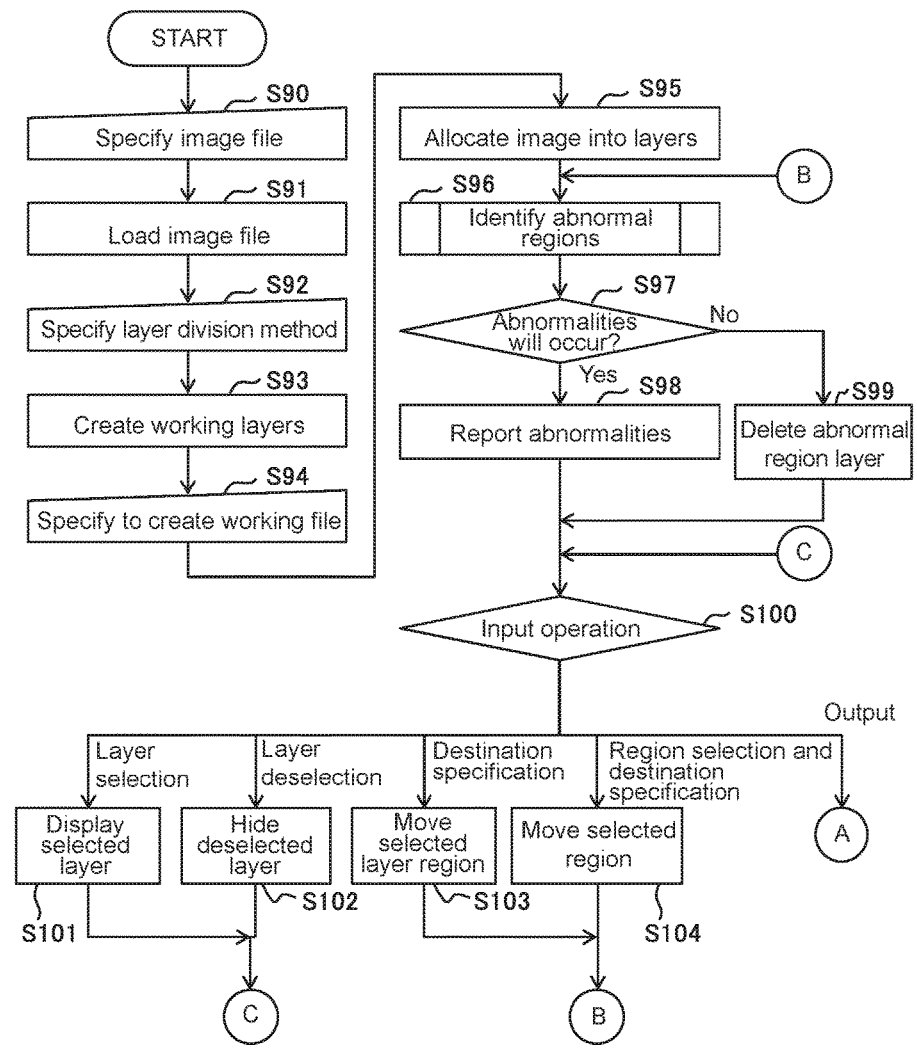
FIG. 5 is a (first) flowchart illustrating a three-dimensional image data creation process for the surfacer.
Figure 6:
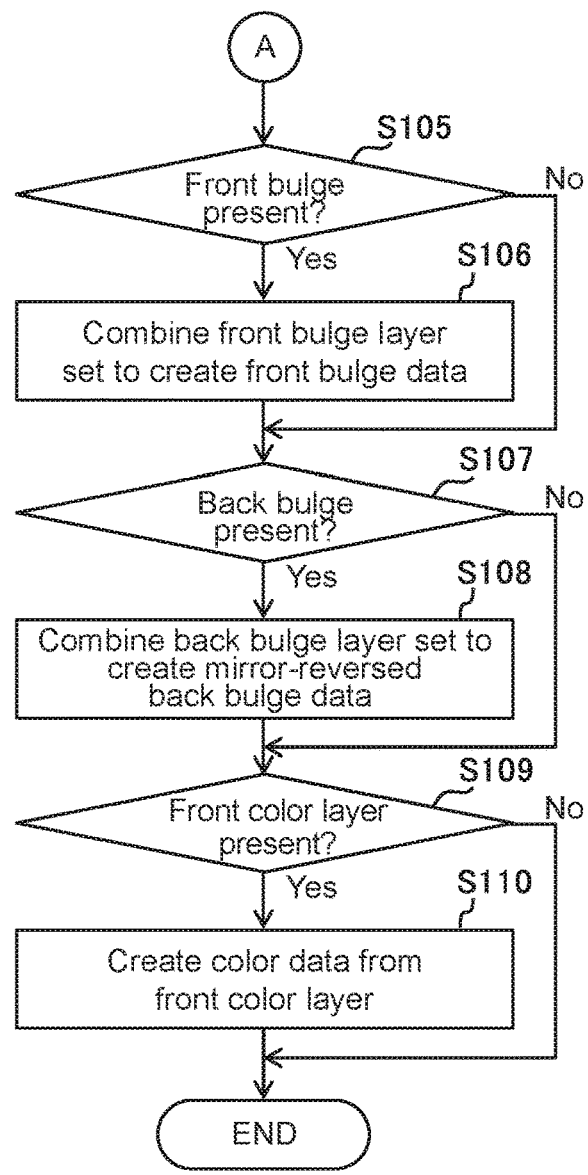
FIG. 6 is a (second) flowchart illustrating the three-dimensional image data creation process for the surfacer.

FIGS. 5 and 6 are flowcharts illustrating a three-dimensional image data creation process when the surfacer 171 is executed. Here, this process will be described with reference to FIGS. 1 and 4 as appropriate.

Figure 8A:
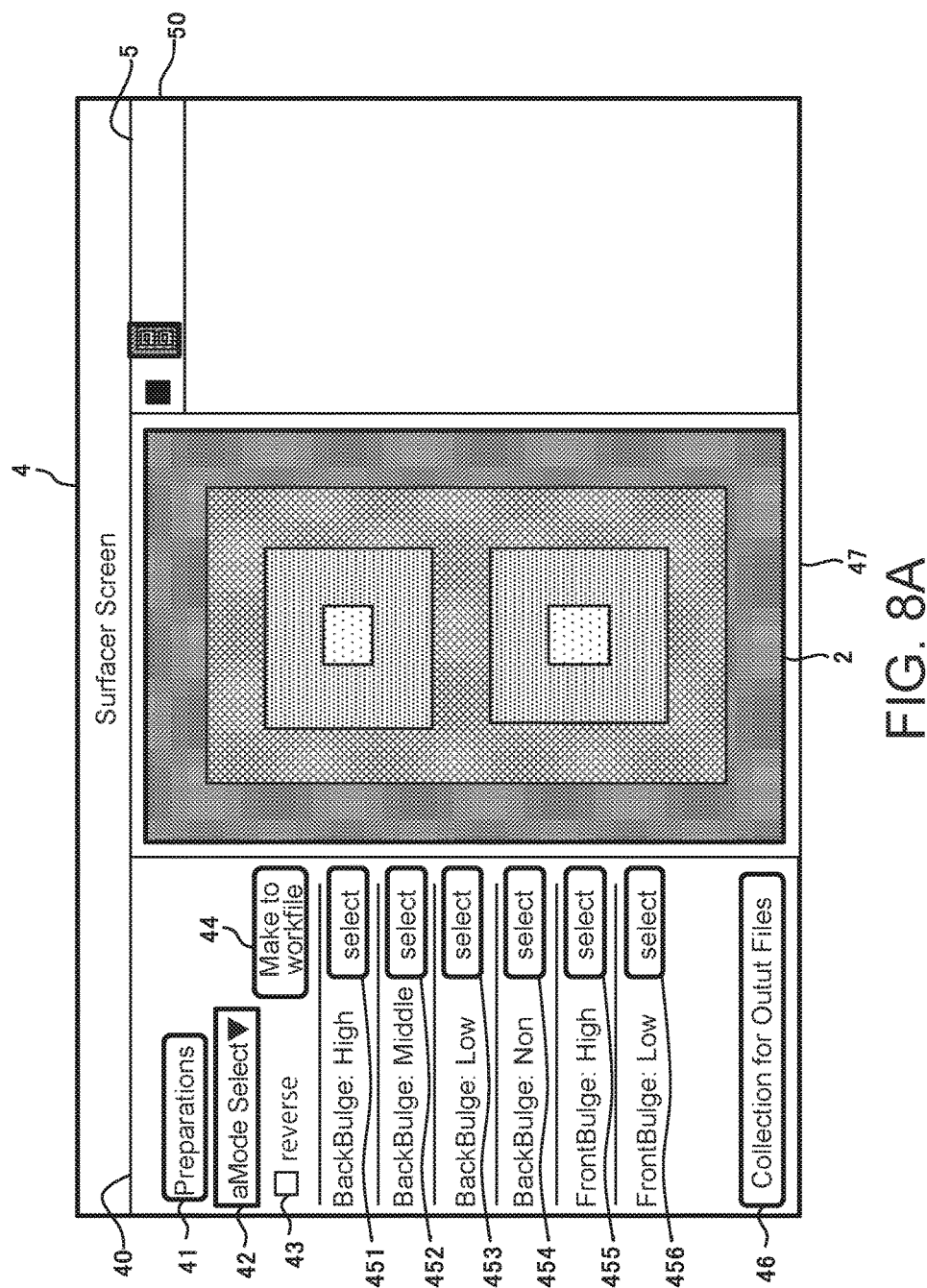
FIG. 8A is an example of a surfacer screen in which image data is displayed.

First, the user opens a file selection dialog or the like on the user terminal 1 (see FIG. 1) and specifies an image file (step S90). The CPU 11 loads the specified image file (step S91) and then loads the image file into the RAM 13 and displays the image file on the display unit 14. FIG. 8A (described later) illustrates the surfacer screen displayed on the display unit 14 at this time.

Figure 8B:
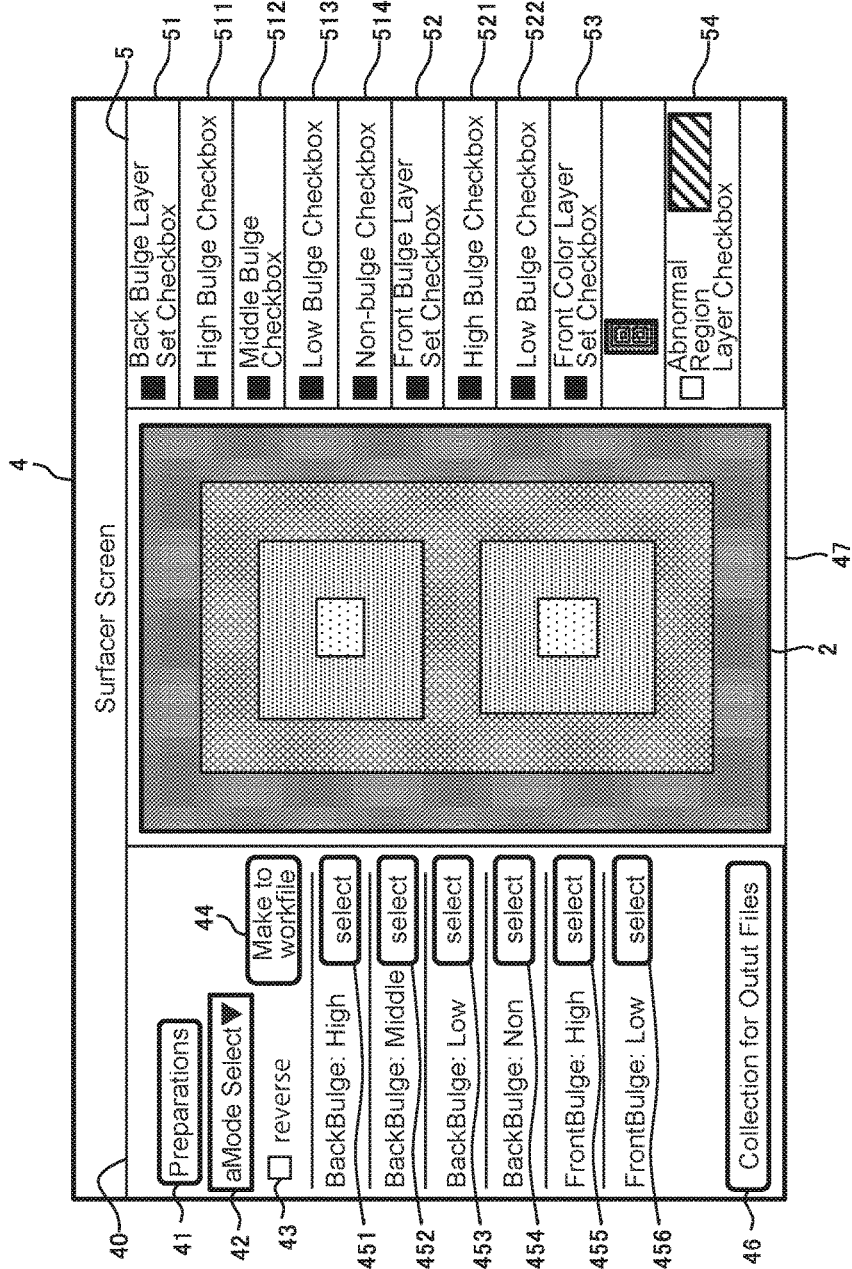
FIG. 8B is an example of the surfacer screen in which layers are displayed in a layer pane.

When the user specifies a layer allocating method on the user terminal 1 (step S92), the CPU 11 creates working layers (step S93) and displays those layers on the display unit 14. FIG. 8B (described later) illustrates the screen displayed on the display unit 14 at this time.

Figure 8C:
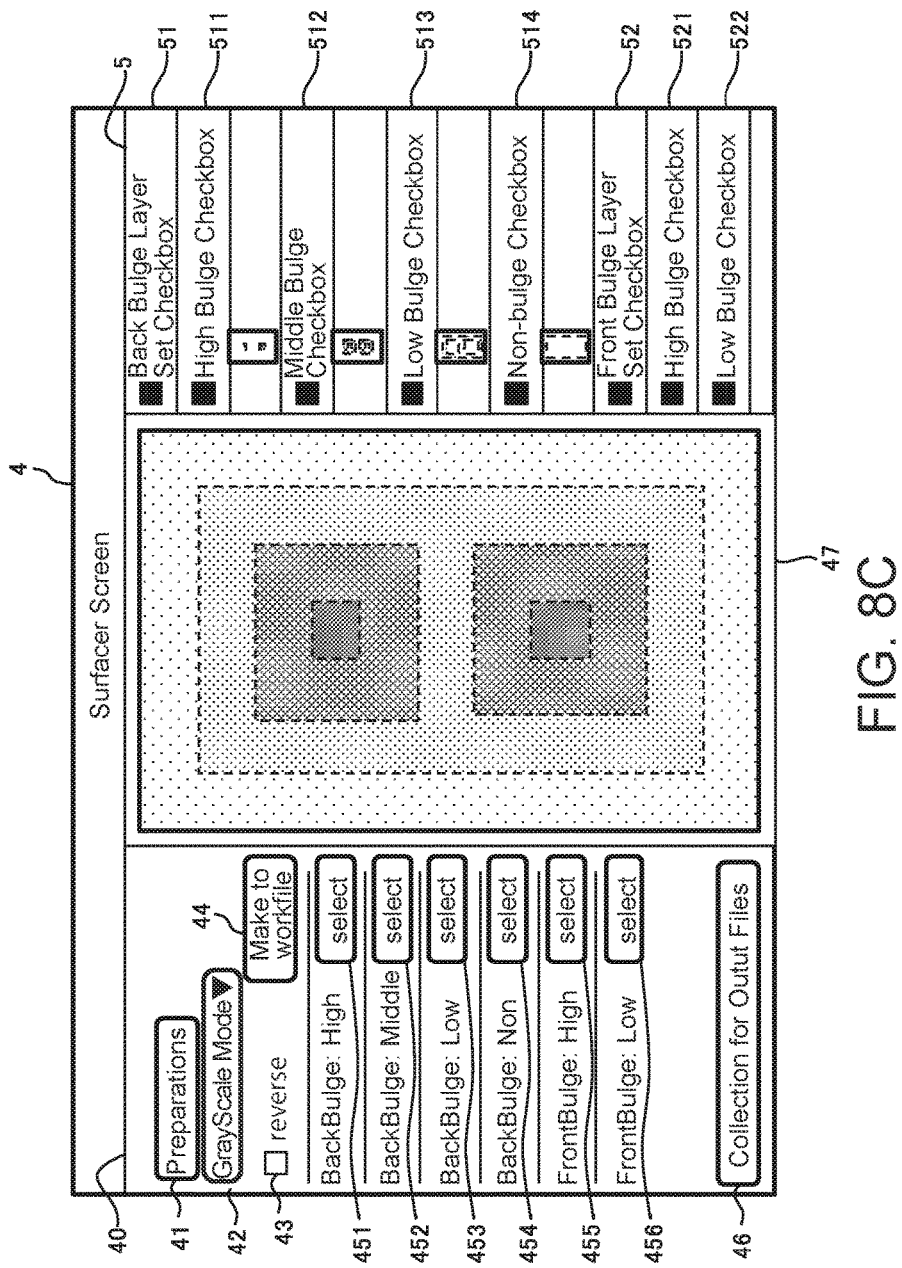
FIG. 8C is an example of the surfacer screen in which regions of the image data are allocated into distension (foaming) data in accordance with specified allocation conditions.

Then, when the user specifies to create a working file on the user terminal 1 (step S94), the CPU 11 allocates the image into the layers (step S95) and displays those layers on the display unit 14. FIG. 8C (described later) illustrates the screen displayed on the display unit 14 at this time.

The CPU 11 identifies potential abnormal distension regions (step S96) and determines whether abnormalities will occur (step S97). This abnormal region determination process will be described in more detail later with reference to FIG. 7. If it is determined that distension abnormalities will occur (Yes), the CPU 11 reports the abnormalities to the user (step S98). If it is determined that distension abnormalities will not occur (No), the CPU 11 deletes the abnormal region layer (step S99).

After the processes in steps S98 and S99, the CPU 11 waits for user input operations (step S100). If a layer selection input operation is received, the CPU 11 proceeds to step S101 and displays the selected layer on the display unit 14 and then returns to step S100 and waits for user input operations. Here, "layer selection input operation" refers to selecting checkboxes corresponding to respective layers.

If a layer deselection input operation is received, the CPU 11 proceeds to step S102 and hides the deselected layer on the display unit 14 and then returns to step S100 and waits for user input operations. Here, "layer deselection input operation" refers to clearing checkboxes corresponding to the layers.

Figure 8D:
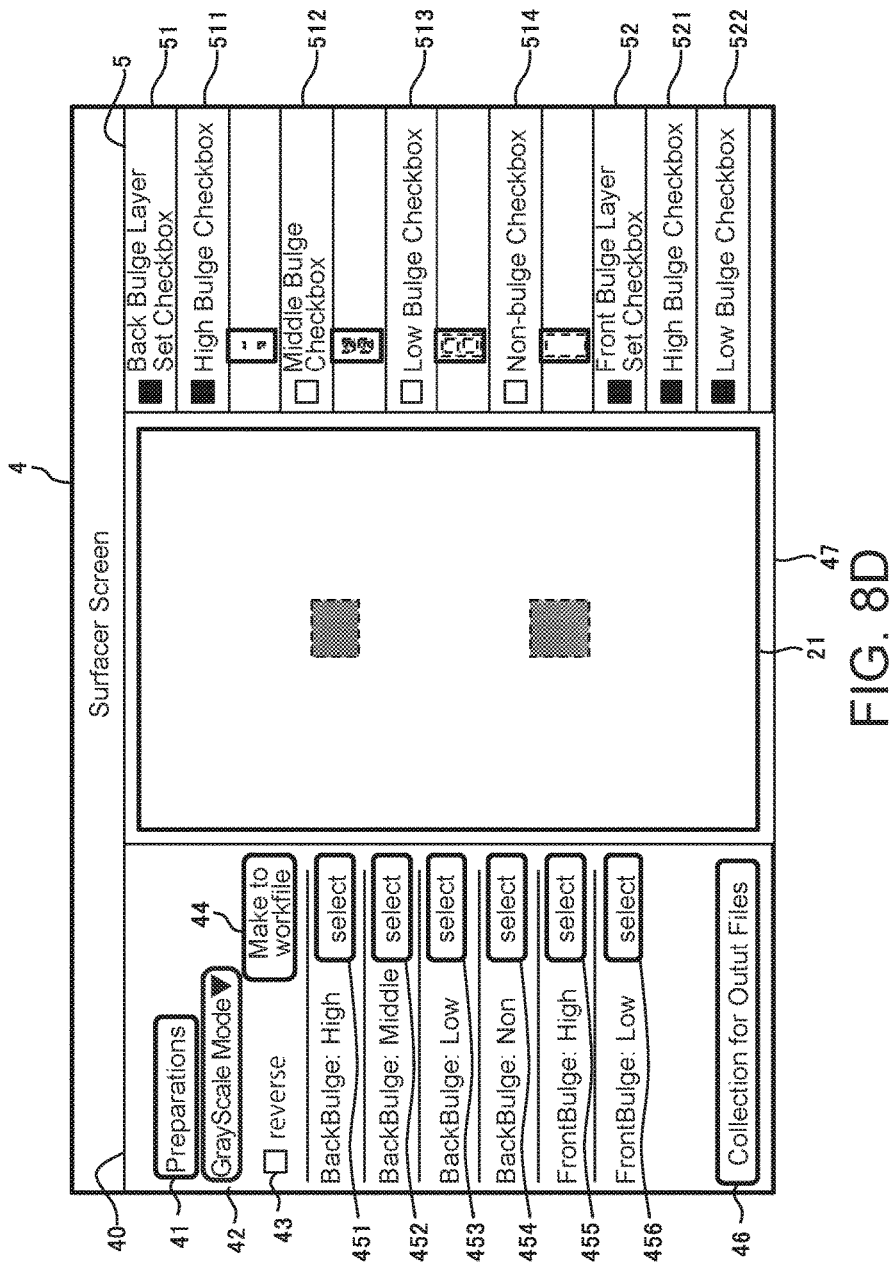
FIG. 8D is an example of the surfacer screen in which a high bulge layer of a back bulge layer set is displayed.
Figure 8E:
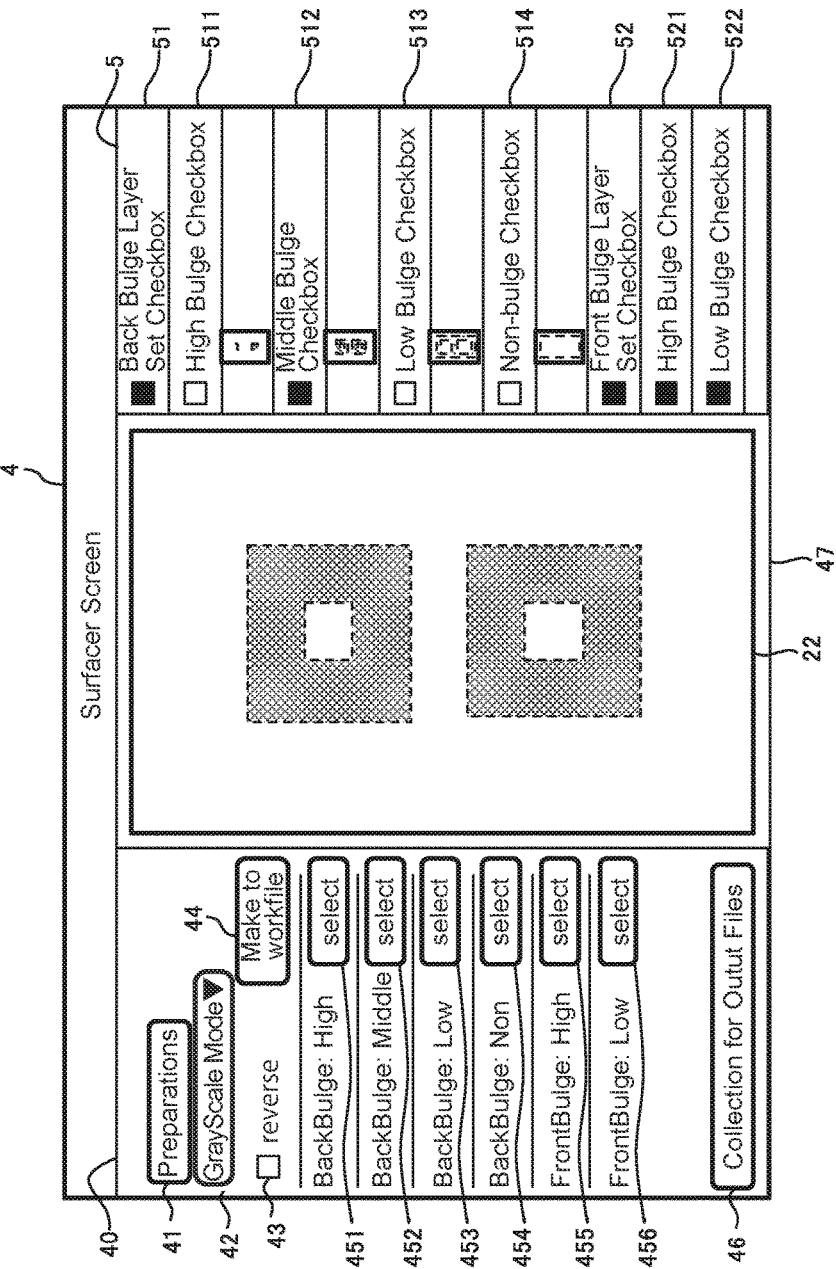
FIG. 8E is an example of the surfacer screen in which a middle bulge layer of the back bulge layer set is displayed.
Figure 8F:
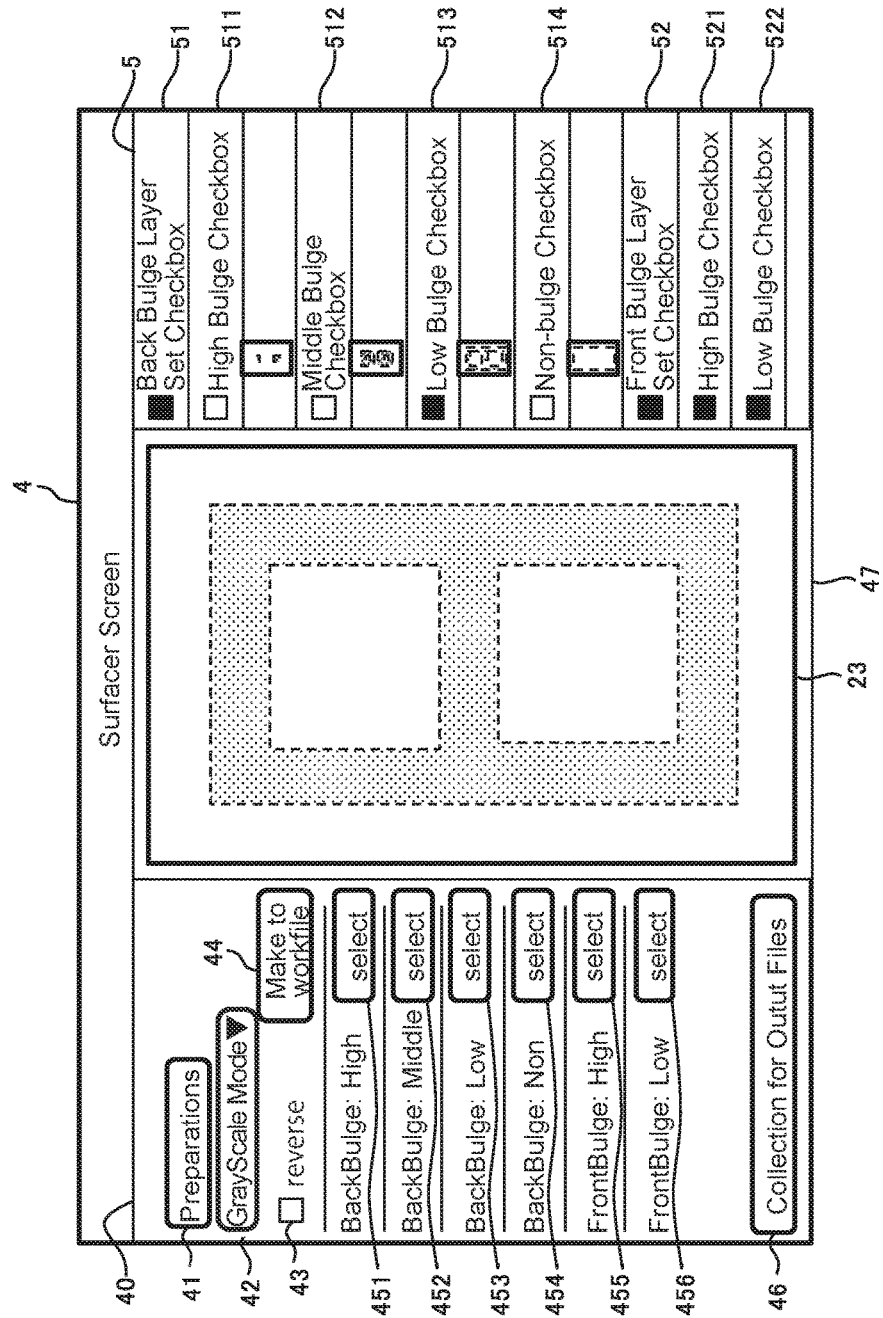
FIG. 8F is an example of the surfacer screen in which a low bulge layer of the back bulge layer set is displayed.
Figure 8G:
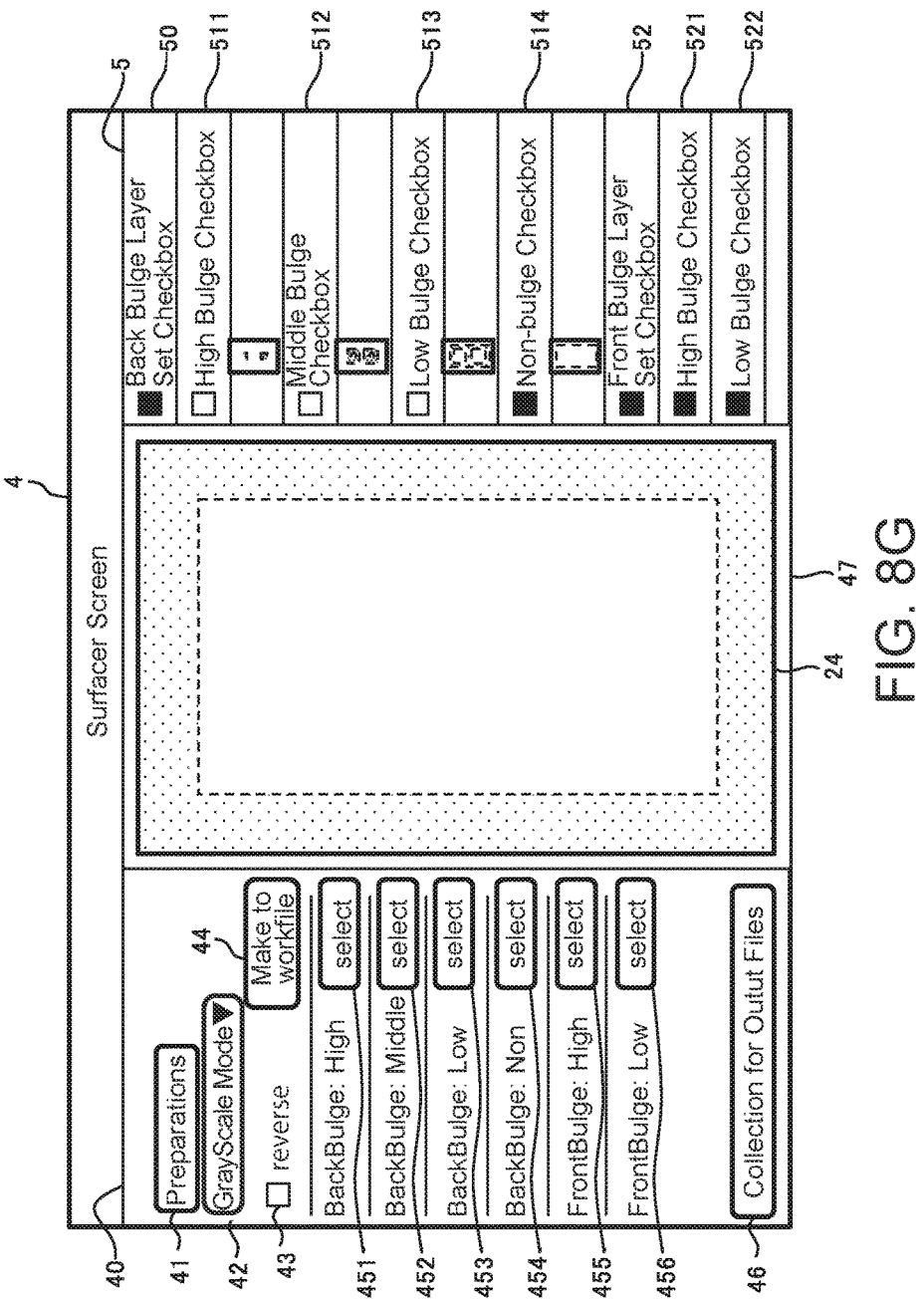
FIG. 8G is an example of the surfacer screen in which a non-bulge layer of the back bulge layer set is displayed.
Figure 8H:
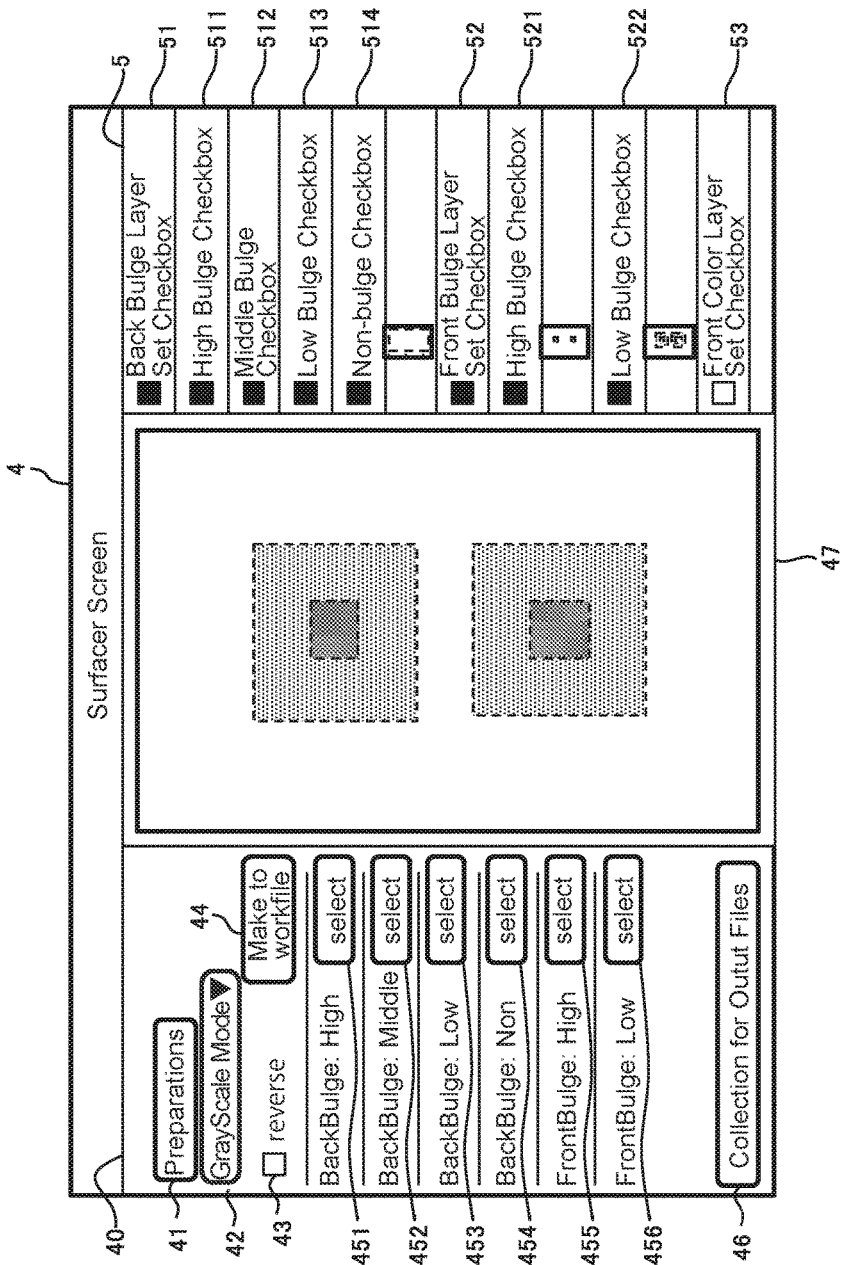
FIG. 8H is an example of the surfacer screen in which a front bulge layer set is displayed.
Figure 8I:
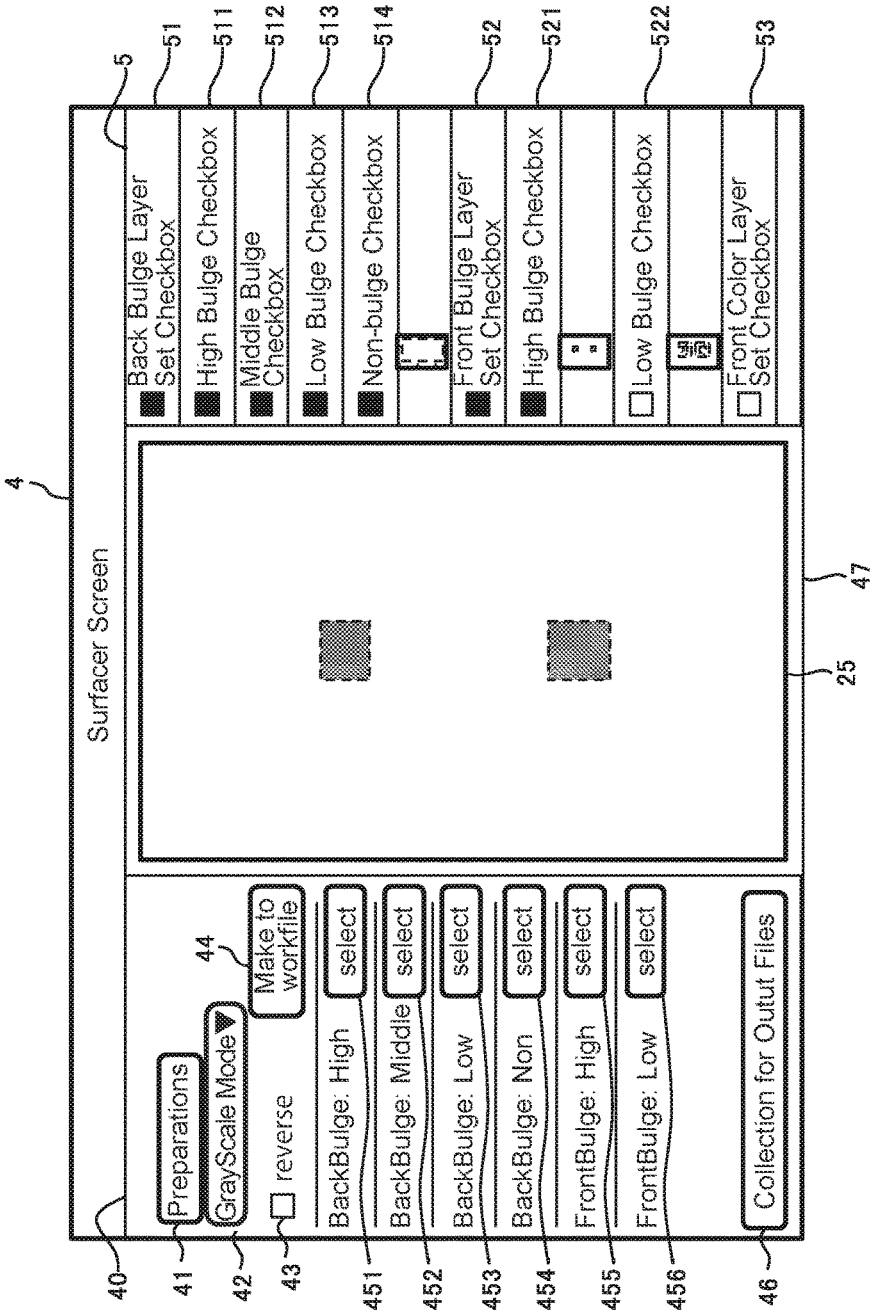
FIG. 8I is an example of the surfacer screen in which a high bulge layer of the front bulge layer set is displayed.
Figure 8J:
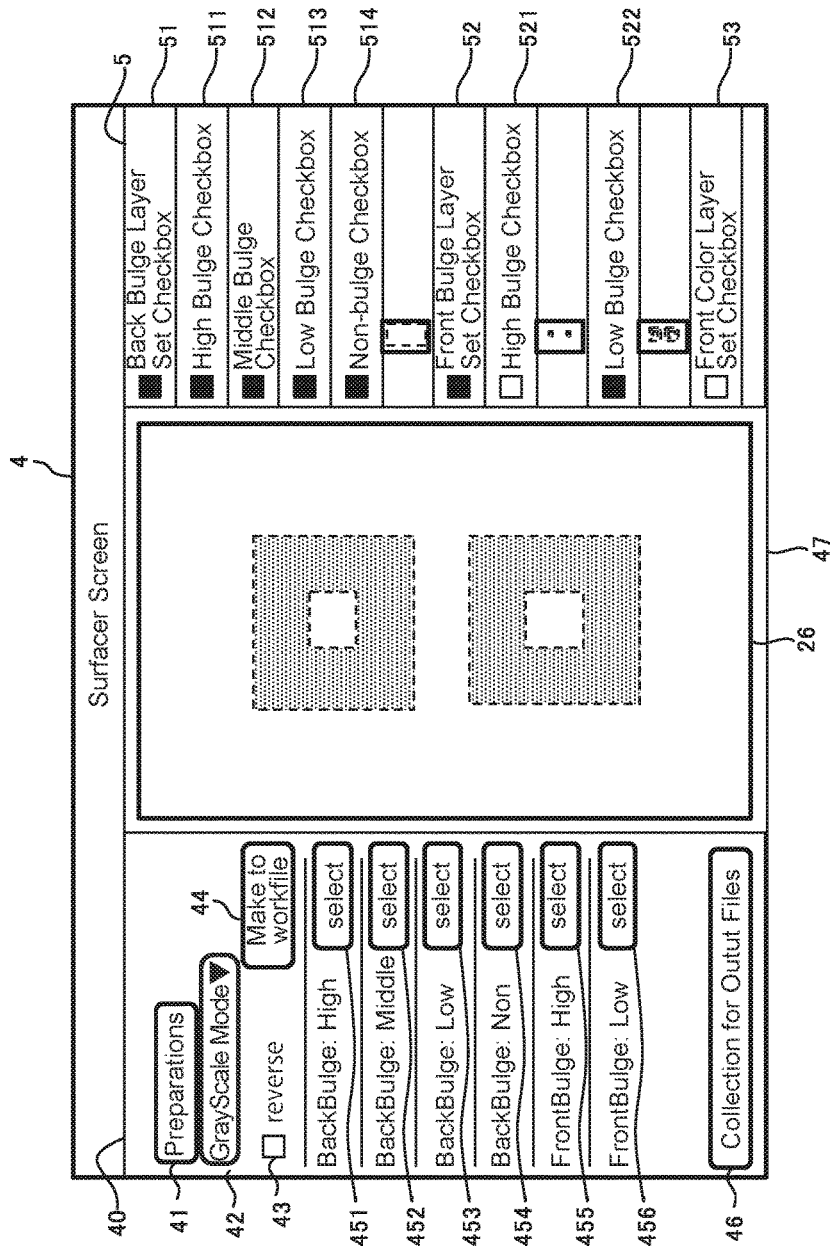
FIG. 8J is an example of the surfacer screen in which a low bulge layer of the front bulge layer set is displayed.

FIGS. 8D to 8J (described later) illustrate the screens displayed on the display unit 14 after steps S101 and S102. Moreover, the screens illustrated in FIGS. 8H to 8J are the screens for when the processes in steps S101 and S102 are executed after first executing the process in step S103 (described later).

If a selected layer destination specification is received in step S100, the CPU 11 proceeds to step S103. Here, "selected layer" refers to a layer for which the corresponding checkbox was selected. The CPU 11 moves the selected layer region (a non-transparent region of a prescribed density) to a destination layer specified using select buttons 451 to 456 illustrated in FIGS. 8A to 8J (step S103), returns to step S96 and identifies abnormal regions, and then waits for user input operations (step S100). In this way, the user can move the back bulge layers (back foaming layers) to the front bulge layers (front foaming layers). FIGS. 8I and 8J (described later) illustrate the screens displayed on the display unit 14 at this time.

If a region selection and a destination specification are received in step S100, the CPU 11 proceeds to step S104. Here, "region selection" refers to the selecting, by the user, of any particular region (a non-transparent region of a prescribed density) from within a selected layer. "Destination specification" refers to selecting the select buttons 451 to 456 illustrated in FIGS. 8A to 8J in order to select the layer corresponding to each button as the destination.

The CPU 11 moves the selected region in the layer selected by the user to the destination layer specified using the select buttons 451 to 456 (step S104), returns to step S96 and identifies abnormal regions, and then waits for user input operations (step S100).

If an output command is received in step S100, the CPU 11 proceeds to step S105 in FIG. 6. Here, "output command" refers to the clicking, by the user, of a Collection for Output Files button 46 illustrated in FIGS. 8A to 8J.

If there are any layers subjected to front bulge (front foaming) (Yes in step S105), the CPU 11 combines the front bulge layer set (front foaming layer set) to create the front bulge data 32 (step S106). If there is no layer subjected to front bulge (front foaming) (No in step S105), the CPU 11 proceeds to step S107.

In step S107, if there are any layers subjected to back bulge (back foaming) (Yes in step S107), the CPU 11 combines the back bulge layer set (back foaming layer set) to create the mirror-reversed back bulge data 31 (step S108). Then, the CPU 11 proceeds to step S109. If there is no layer subjected to back bulge (back foaming) (No in step S107), the CPU 11 proceeds to step S109.

In step S109, if the front color layer 27 is present (Yes in step S109), the CPU 11 creates the color data 33 from the front color layer 27 (step S110). If the front color layer 27 is not present (No in step S109), the CPU 11 ends the process illustrated in FIG. 6. In this way, the CPU 11 outputs data managed for each layer on the user terminal 1 as a content file, thereby making it possible to load the content file into the optimizer 172 at a later stage and optimize the content for the thermally distensible sheet.

Figure 7:
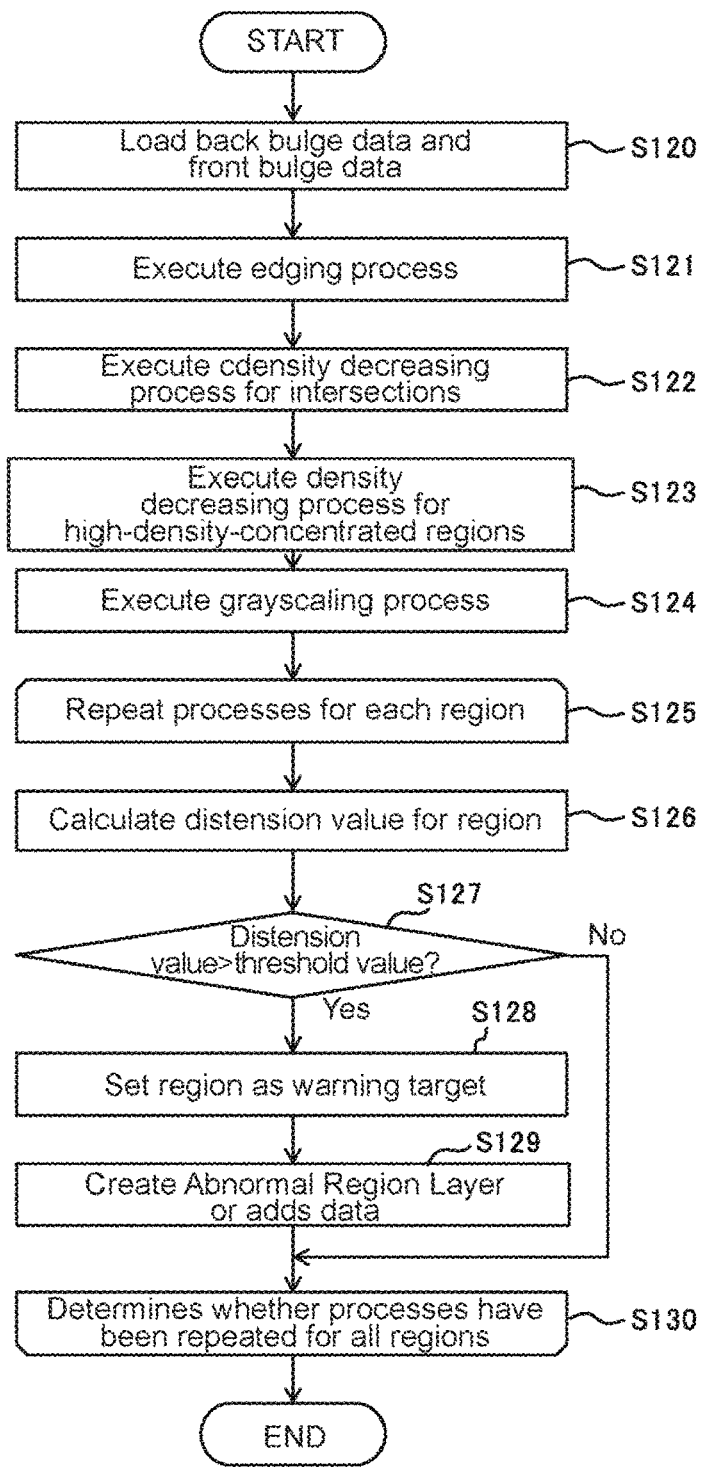
FIG. 7 is a flowchart illustrating an abnormal region warning process for the surfacer.

FIG. 7 is a flowchart illustrating a process for the surfacer 171 and will be described with references to FIGS. 1 and 5 as appropriate.

The CPU 11 loads the back bulge data 31 and the front bulge data 32 that were allocated in step S95 (step S120) and then executes an edging process for high density regions in the back bulge data 31 (step S121). In this edging process, the CPU 11 further increases the density of the edges of the high density regions. This makes it possible to clearly define the edges of the protrusion regions that will distend from these high density regions.

The CPU 11 executes a density decreasing process for intersections (step S122). In this density decreasing process for intersections, the CPU 11 decreases the density of intersections between high density lines in the back bulge data 31 and the front bulge data 32. This makes it possible to prevent abnormal distension at such intersections. Here, the CPU 11 functions as a replacing unit that replaces data for regions for which it is predicted that the thermally distensible layer will distend abnormally with data that will not cause the thermally distensible layer to distend abnormally.

Next, the CPU 11 executes a density decreasing process for high-density-concentrated regions (step S123). In this density decreasing process for high-density-concentrated regions, the CPU 11 decreases the density of high-density-concentrated regions in the back bulge data 31 and the front bulge data 32. This makes it possible to prevent abnormal distension in such high-density-concentrated regions. Here, the CPU 11 functions as the replacing unit that replaces data for regions for which it is predicted that the thermally distensible layer will distend abnormally with data that will not cause the thermally distensible layer to distend abnormally.

The processes in steps S121 to S123 are optimization processes for the 2.5D printer system 7. After completing these optimization processes, the CPU 11 executes a grayscaling process (step S124). In this grayscaling process, the CPU 11 performs the density conversion illustrated in the graph in FIG. 12.

The back bulge data 31 and the front bulge data 32 in the original content 3A are provided with density values for a thermally distensible sheet having ideal properties. Here, "ideal properties" refers to properties that exhibit a perfect correspondence between density and distension height, for example, such as the properties with which a density of X % yields a distension height of X %.

However, in an actual thermally distensible sheet, the distension height becomes saturated when the density exceeds a first prescribed value, and no distension occurs when the density is less than a second prescribed value. Moreover, between this first prescribed value and second prescribed value, the relationship between density and distension height is non-linear. If the back bulge data 31 and the front bulge data 32 in the original content 3A were to be printed on the thermally distensible sheet and irradiated with light, the three-dimensional object formed would have distension heights different from those envisioned during content creation. Therefore, the CPU 11 converts the densities that assume ideal properties to densities corresponding to the properties of the actual thermally distensible sheet. Thus, when the converted distension data is printed on the thermally distensible sheet and irradiated with light, the three-dimensional object formed will have the distension heights envisioned during content creation.

After the grayscaling process, the CPU 11 repeats the processes in steps S125 to S130 for each region. Here, the CPU 11 functions as an identification unit that, on the basis of bump data, identifies regions for which it is predicted that the thermally distensible layer will distend abnormally. Moreover, "regions" refers to regions divided into a grid pattern in the planar direction.

The CPU 11 calculates a distension value for a given region (step S126). This calculated distension value is obtained by adding a density integral of the back bulge data 31 for the region to a value obtained by multiplying a density integral of the front bulge data 32 for the region by a prescribed coefficient. The prescribed coefficient is a value obtained by dividing a distension amount determined by the distension data for the front surface side by a distension amount determined by the distension data for the rear surface side.

If the calculated distension value exceeds a threshold value (Yes in step S127), the CPU 11 sets the region as a warning target (step S128). It is because when the calculated distension value exceeds this threshold value, the thermally distensible layer in the region is expected to distend abnormally. In step S129, the CPU 11 creates the abnormal region layer 28 or adds data to the abnormal region layer 28.

If the calculated distension value does not exceed the threshold value (No in step S127), the CPU 11 proceeds to the process in step S130.

In step S130, the CPU 11 determines whether the processes in steps S125 to S130 have been repeated for all of the regions. If there are any unprocessed regions, the CPU 11 returns to step S125 and repeats the processes. Upon completing the process in step S130, the CPU 11 ends the process illustrated in FIG. 7.

FIG. 8A is an example of a surfacer screen 4 in which the image data 2 is displayed.

In the surfacer screen 4, an operations pane 40 is displayed on the left side, an image pane 47 is displayed in the center, and a layer pane 5 is displayed on the right side.

In the operations pane 40, a Preparations button 41, an aMode Select menu 42, a reverse checkbox 43, a Make to Workfile button 44, select buttons 451 to 456, and a Collection for Output Files button 46 are displayed.

The Preparations button 41 is a button for preparing a storage location for the layers. Here, "layers" includes layers of distension data allocated into regions and a layer that provides color information for all of the regions. The layers of distension data allocated into regions are the high bulge layer 21, the middle bulge layer 22, the low bulge layer 23, the non-bulge layer 24, the high bulge layer 25, and the low bulge layer 26 illustrated in FIG. 4 as described above. The layer that provides color information for all of the regions is the front color layer 27.

The aMode Select menu 42 is a menu for selecting conditions for allocating regions in the image data 2 into distension data, with which a brightness-based allocation mode can be selected. The reverse checkbox 43 reverses the conditions for allocating the regions in the image data into distension data.

The Make to Workfile button 44 allocates the regions in the image data 2 into distension data in accordance with the specified allocation conditions. When the Make to Workfile button 44 is clicked while the brightness-based allocation mode is selected, regions with low brightness that are approximately black are assigned to the non-bulge layer 24. Regions with high brightness that are approximately white are assigned to the high bulge layer 21. Regions with medium brightness are assigned to the middle bulge layer 22 or the low bulge layer 23 in accordance with the respective brightnesses of those regions.

When the Make to Workfile button 44 is clicked while the brightness-based allocation mode is selected and the reverse checkbox 43 is also selected, regions with low brightness that are approximately black are assigned to the high bulge layer 21. Regions with high brightness that are approximately white are assigned to the non-bulge layer 24. Regions with medium brightness are assigned to the low bulge layer 23 or the middle bulge layer 22 in accordance with the respective brightnesses of those regions.

The select buttons 451 to 456 move a selected layer or a selected region in a selected layer to the layers corresponding to the select buttons 451 to 456 and also change the density to that of the destination layer.

When a layer or a region within a layer is selected and then the select button 451 is clicked, the CPU 11 moves the selected layer or region to the high bulge layer 21 and changes the density to 100%. When the select button 452 is clicked, the CPU 11 moves the selected layer or region to the middle bulge layer 22 and changes the density to 66%. When the select button 453 is clicked, the CPU 11 moves the selected layer or region to the low bulge layer 23 and changes the density to 33%. When the select button 454 is clicked, the CPU 11 moves the selected layer or region to the non-bulge layer 24 and changes the density to 0%. When the select button 455 is clicked, the CPU 11 moves the selected layer or region to the high bulge layer 25 and changes the density to 50%. When the select button 456 is clicked, the CPU 11 moves the selected layer or region to the low bulge layer 26 and changes the density to 25%.

The Collection for Output Files button 46 is a button that issues a data output command. When the Collection for Output Files button 46 is clicked, the CPU 11 combines and mirror-reverses the layers in the back bulge layer set and outputs the resulting data as the back bulge data 31. The CPU 11 also combines the layers in the front bulge layer set, outputs the resulting data as the front bulge data 32, and outputs the front color layer 27 as the color data 33.

In the image pane 47, the image data 2 is displayed. The layer pane 5 is arranged on the right side of the image pane 47 and displays therein a layer checkbox 50 corresponding to the image data 2. In the drawings for the present embodiment, black checkboxes represent the selected state and white checkboxes represent the cleared state. In the layer checkbox 50, a thumbnail of the image data 2 is displayed.

In the surfacer screen 4 illustrated in FIG. 8A, when the Preparations button 41 is clicked, a storage location for the layers is prepared, and the display state transitions to the surfacer screen 4 illustrated in FIG. 8B.

FIG. 8B is an example of the surfacer screen 4 in which layers are displayed in the layer pane 5.

In the surfacer screen 4 illustrated in FIG. 8B, the front color layer 27 is displayed in the image pane 47. In the layer pane 5 arranged on the right side of the image pane 47, a back bulge layer set checkbox 51, a front bulge layer set checkbox 52, and a front color layer set checkbox 53 are displayed. The back bulge layer set checkbox 51 is used to display back bulge layers in the image pane 47. The front bulge layer set checkbox 52 is used to display front bulge layers in the image pane 47. The front color layer set checkbox 53 is used to display the front color layer 27 in the image pane 47. An abnormal region layer checkbox 54 is used to display the abnormal region layer 28 in the image pane 47. In FIG. 8B, all of the checkboxes included in the layer pane 5 are in the selected state, and the abnormal region layer checkbox 54 is in the cleared state. Below the front color layer set checkbox 53, a thumbnail of the front color layer 27 is displayed.

Below the back bulge layer set checkbox 51, a high bulge checkbox 511, a middle bulge checkbox 512, a low bulge checkbox 513, and a non-bulge checkbox 514 are displayed. The high bulge checkbox 511 is used to display the high bulge layer 21 in the image pane 47. The middle bulge checkbox 512 is used to display the middle bulge layer 22 in the image pane 47. The low bulge checkbox 513 is used to display the low bulge layer 23 in the image pane 47. The non-bulge checkbox 514 is used to display the non-bulge layer 24 in the image pane 47. In FIG. 8B, the high bulge checkbox 511, the middle bulge checkbox 512, the low bulge checkbox 513, and the non-bulge checkbox 514 are all in the selected state.

Below the front bulge layer set checkbox 52, a high bulge checkbox 521 and a low bulge checkbox 522 are displayed. The high bulge checkbox 521 is used to display the high bulge layer 25 in the image pane 47. The low bulge checkbox 522 is used to display the low bulge layer 26 in the image pane 47. In FIG. 8B, the high bulge checkbox 521 and the low bulge checkbox 522 are both in the selected state.

In the surfacer screen 4 illustrated in FIG. 8B, when the user clicks the Make to Workfile button 44, the display state transitions to the surfacer screen 4 illustrated in FIG. 8C. Moreover, in the surfacer screen 4 illustrated in FIG. 8B, when the user clicks the abnormal region layer checkbox 54, the display state transitions to the surfacer screen 4 illustrated in FIG. 8K.

FIG. 8C is an example of the surfacer screen 4 in which the regions of the image data 2 are allocated into distension data in accordance with the specified allocation conditions.

Thus, when the user clicks the Make to Workfile button 44, the CPU 11 executes the surfacer 171 to assign layers to the back bulge data (back foaming data). Regions of the image data 2 with a brightness of greater than 75% are moved to the high bulge layer 21. As these regions are moved, the density value for the high bulge layer 21 is changed to a prescribed density value (such as a density of 100%). Regions of the image data 2 with a brightness of greater than 50% and less than or equal to 75% are moved to the middle bulge layer 22. As these regions are moved, the density value for the middle bulge layer 22 is changed to a prescribed density value (such as a density of 66%). Regions of the image data 2 with a brightness of greater than 25% and less than or equal to 50% are moved to the low bulge layer 23. As these regions are moved, the density value for the low bulge layer 23 is changed to a prescribed density value (such as a density of 33%). Regions of the image data 2 with a brightness of less than or equal to 25% are moved to the non-bulge layer 24. As these regions are moved, the density value for the non-bulge layer 24 is changed to a prescribed density value (such as a density of 0%).

Next, the checkboxes displayed for all of the layers are selected. Moreover, an image in which all of the layers are superimposed is displayed in the image pane 47. Then, if the user wants to view an individual layer image (such as for the high bulge layer 21), the user should clear the checkboxes for the layers other than the target layer.

In the surfacer screen 4 illustrated in FIG. 8C, all of the layers included in the back bulge layer set are displayed in a combined manner in the image pane 47. In the layer pane 5 arranged on the right side of the image pane 47, the back bulge layer set checkbox 51 and the front bulge layer set checkbox 52 are displayed. Note that although here the front color layer set checkbox 53 is hidden below the bottom of the screen, the user can scroll the layer pane 5 to show the front color layer set checkbox 53.

In FIG. 8C, the back bulge layer set checkbox 51, the high bulge checkbox 511, the middle bulge checkbox 512, the low bulge checkbox 513, and the non-bulge checkbox 514 are in the selected state, which indicates that all of the layers included in the back bulge layer set are displayed in the image pane 47.

Below the high bulge checkbox 511, a thumbnail of the high bulge layer 21 is displayed. Below the middle bulge checkbox 512, a thumbnail of the middle bulge layer 22 is displayed. Below the low bulge checkbox 513, a thumbnail of the low bulge layer 23 is displayed. Below the non-bulge checkbox 514, a thumbnail of the non-bulge layer 24 is displayed.

Below the front bulge layer set checkbox 52, the high bulge checkbox 521 and the low bulge checkbox 522 are displayed. The front bulge layer set checkbox 52, the high bulge checkbox 521, and the low bulge checkbox 522 are also in the selected state. However, there is currently no front bulge data 32, high bulge layer 25, or low bulge layer 26, and therefore nothing is displayed for these items.

In the surfacer screens 4 illustrated in FIGS. 8C to 8G, when the user clicks the Collection for Output Files button 46, the CPU 11 outputs the content 3. In other words, the CPU 11 outputs the back bulge data 31 in which the high bulge layer 21, the middle bulge layer 22, the low bulge layer 23, and the non-bulge layer 24 are combined and mirror-reversed and also outputs the front color layer 27 as the color data 33.

In the surfacer screen 4 illustrated in FIG. 8C, if the user clears the middle bulge checkbox 512, the low bulge checkbox 513, and the non-bulge checkbox 514, the display state transitions to the surfacer screen 4 illustrated in FIG. 8D.

FIG. 8D is an example of the surfacer screen 4 in which the high bulge layer 21 of the back bulge layer set is displayed.

In the surfacer screen 4 illustrated in FIG. 8D, the high bulge layer 21 included in the back bulge layer set is displayed in the image pane 47. In the layer pane 5 arranged on the right side of the image pane 47, only the back bulge layer set checkbox 51 and the high bulge checkbox 511 are in the selected state, which indicates that the high bulge layer 21 is displayed in the image pane 47. The middle bulge checkbox 512, the low bulge checkbox 513, and the non-bulge checkbox 514 are in the cleared state. This high bulge layer 21 includes a region of a prescribed density (such as a density of 100%) indicated by hatching as well as a transparent region displayed in white.

In the surfacer screen 4 illustrated in FIG. 8D, if the user selects the middle bulge checkbox 512 and clears the high bulge checkbox 511, the display state transitions to the surfacer screen 4 illustrated in FIG. 8E.

FIG. 8E is an example of the surfacer screen 4 in which the middle bulge layer 22 of the back bulge layer set is displayed.

In the surfacer screen 4 illustrated in FIG. 8E, the middle bulge layer 22 included in the back bulge layer set is displayed in the image pane 47. In the layer pane 5 arranged on the right side of the image pane 47, the back bulge layer set checkbox 51 and the middle bulge checkbox 512 are in the selected state, which indicates that the middle bulge layer 22 is displayed in the image pane 47. The high bulge checkbox 511, the low bulge checkbox 513, and the non-bulge checkbox 514 are in the cleared state. This middle bulge layer 22 includes a region of a prescribed density (such as a density of 66%) indicated by hatching as well as a transparent region displayed in white.

The front bulge layer set checkbox 52, the high bulge checkbox 521, and the low bulge checkbox 522 are also in the selected state. However, there is currently no front bulge data 32, high bulge layer 25, or low bulge layer 26, and therefore nothing is displayed for these items.

In the surfacer screen 4 illustrated in FIG. 8E, if the user selects the low bulge checkbox 513 and clears the middle bulge checkbox 512, the display state transitions to the surfacer screen 4 illustrated in FIG. 8F. Moreover, if the user selects the back bulge layer set checkbox 51, this also selects the high bulge checkbox 511, the middle bulge checkbox 512, the low bulge checkbox 513, and the non-bulge checkbox 514, and the display state transitions to the surfacer screen 4 illustrated in FIG. 8C. This makes it possible to easily preview the image that will be printed for the back bulges (back foaming).

FIG. 8F is an example of the surfacer screen 4 in which the low bulge layer 23 of the back bulge layer set is displayed.

In the surfacer screen 4 illustrated in FIG. 8F, the low bulge layer 23 included in the back bulge layer set is displayed in the image pane 47. In the layer pane 5 arranged on the right side of the image pane 47, the back bulge layer set checkbox 51 and the low bulge checkbox 513 are in the selected state, which indicates that the low bulge layer 23 is displayed in the image pane 47. The high bulge checkbox 511, the middle bulge checkbox 512, and the non-bulge checkbox 514 are in the cleared state. This low bulge layer 23 includes a region of a prescribed density (such as a density of 33%) indicated by hatching as well as a transparent region displayed in white.

The front bulge layer set checkbox 52, the high bulge checkbox 521, and the low bulge checkbox 522 are also in the selected state. However, there is currently no front bulge data 32, high bulge layer 25, or low bulge layer 26, and therefore nothing is displayed for these items.

In the surfacer screen 4 illustrated in FIG. 8F, if the user selects the non-bulge checkbox 514 and clears the low bulge checkbox 513, the display state transitions to the surfacer screen 4 illustrated in FIG. 8G.

FIG. 8G is an example of the surfacer screen 4 in which the non-bulge layer 24 of the back bulge layer set is displayed.

In the surfacer screen 4 illustrated in FIG. 8G, the non-bulge layer 24 included in the back bulge layer set is displayed in the image pane 47. In the layer pane 5 arranged on the right side of the image pane 47, the back bulge layer set checkbox 51 and the non-bulge checkbox 514 are in the selected state, which indicates that the non-bulge layer 24 is displayed in the image pane 47. The high bulge checkbox 511, the middle bulge checkbox 512, and the low bulge checkbox 513 are in the cleared state. This non-bulge layer 24 includes a region of a prescribed density (such as a density of 0%) indicated by hatching as well as a transparent region displayed in white.

The front bulge layer set checkbox 52, the high bulge checkbox 521, and the low bulge checkbox 522 are also in the selected state. However, there is currently no front bulge data 32, high bulge layer 25, or low bulge layer 26, and therefore nothing is displayed for these items.

FIGS. 8H to 8J (described below) illustrate states in which two layers in the back bulge layer set have been moved to the front bulge layer set and the low bulge layer 23 in the back bulge layer set has been moved to the non-bulge layer 24.

When the user selects the thumbnail below the high bulge checkbox 511 and then clicks the select button 455, the high bulge layer 21 included in the back bulge layer set is moved to the high bulge layer 25 included in the front bulge layer set. As this layer is moved, the density value for the high bulge layer 21 is changed to a density value (such as a density of 50%) which is preset for the high bulge layer 25 of the front bulge layer set.

When the user selects the thumbnail below the middle bulge checkbox 512 and then clicks the select button 456, the middle bulge layer 22 included in the back bulge layer set is moved to the low bulge layer 26 included in the front bulge layer set. As this layer is moved, the density value for the middle bulge layer 22 is changed to a density value (such as a density of 25%) which is preset for the low bulge layer 26 of the front bulge layer set.

When the user selects the thumbnail below the low bulge checkbox 513 and then clicks the select button 454, the low bulge layer 23 included in the back bulge layer set is moved to the non-bulge layer 24. As this layer is moved, the density value for the low bulge layer 23 is changed to a density value (such as a density of 0%) which is preset for the non-bulge layer 24.

FIG. 8H is an example of the surfacer screen 4 in which the front bulge layer set is displayed.

In the surfacer screen 4 illustrated in FIG. 8H, all of the layers included in the front bulge layer set are displayed in a combined manner in the image pane 47.

In FIG. 8H, the front bulge layer set checkbox is in the selected state.

Below the front bulge layer set checkbox 52, the high bulge checkbox 521 and the low bulge checkbox 522 are displayed. In FIG. 8H, the high bulge checkbox 521 and the low bulge checkbox 522 are in the selected state, which indicates that these layers are displayed in a combined manner in the image pane 47. Below the high bulge checkbox 521, a thumbnail of the high bulge layer 25 is displayed. Below the low bulge checkbox 522, a thumbnail of the low bulge layer 26 is displayed.

In the surfacer screens 4 illustrated in FIGS. 8H to 8J, when the user clicks the Collection for Output Files button 46, the CPU 11 outputs the content 3. In other words, the CPU 11 outputs the front bulge data 32 in which the high bulge layer 25 and the low bulge layer 26 are combined and also outputs the front color layer 27 as the color data 33.

In the surfacer screen 4 illustrated in FIG. 8H, if the user clears the low bulge checkbox 522, the display state transitions to the surfacer screen 4 illustrated in FIG. 8I.

FIG. 8I is an example of the surfacer screen in which the high bulge layer of the front bulge layer set is displayed.

In the surfacer screen 4 illustrated in FIG. 8I, the high bulge layer 25 included in the front bulge layer set is displayed in the image pane 47. In the layer pane 5 arranged on the right side of the image pane 47, the front bulge layer set checkbox 52 and the high bulge checkbox 521 are in the selected state, which indicates that the high bulge layer 25 is displayed in the image pane 47. The low bulge checkbox 522 is in the cleared state. This high bulge layer 25 includes a region of a prescribed density (such as a density of 50%) indicated by hatching as well as a transparent region displayed in white.

The back bulge layer set checkbox 51, the high bulge checkbox 511, the middle bulge checkbox 512, the low bulge checkbox 513, and the non-bulge checkbox 514 are also in the selected state. However, there is currently no back bulge data 31, high bulge layer 21, middle bulge layer 22, low bulge layer 23, or non-bulge layer 24, and therefore nothing is displayed for these items.

In the surfacer screen 4 illustrated in FIG. 8I, if the user selects the low bulge checkbox 522 and clears the high bulge checkbox 521, the display state transitions to the surfacer screen 4 illustrated in FIG. 8J. Moreover, if the user selects the front bulge layer set checkbox 52, this also selects the high bulge checkbox 521 and the low bulge checkbox 522, and the display state transitions to the surfacer screen 4 illustrated in FIG. 8H. This makes it possible to easily preview the image that will be printed for the front bulges (front foaming).

FIG. 8J is an example of the surfacer screen 4 in which the low bulge layer of the front bulge layer set is displayed.

In the surfacer screen 4 illustrated in FIG. 8J, the low bulge layer 26 included in the front bulge layer set is displayed in the image pane 47. In the layer pane 5 arranged on the right side of the image pane 47, the front bulge layer set checkbox 52 and the low bulge checkbox 522 are in the selected state, which indicates that the low bulge layer 26 is displayed in the image pane 47. The high bulge checkbox 521 is in the cleared state. This low bulge layer 26 includes a region of a prescribed density (such as a density of 25%) indicated by hatching as well as a transparent region displayed in white.

The back bulge layer set checkbox 51, the high bulge checkbox 511, the middle bulge checkbox 512, the low bulge checkbox 513, and the non-bulge checkbox 514 are also in the selected state. However, there is currently no back bulge data 31, high bulge layer 21, middle bulge layer 22, low bulge layer 23, or non-bulge layer 24, and therefore nothing is displayed for these items.

Figure 8K:
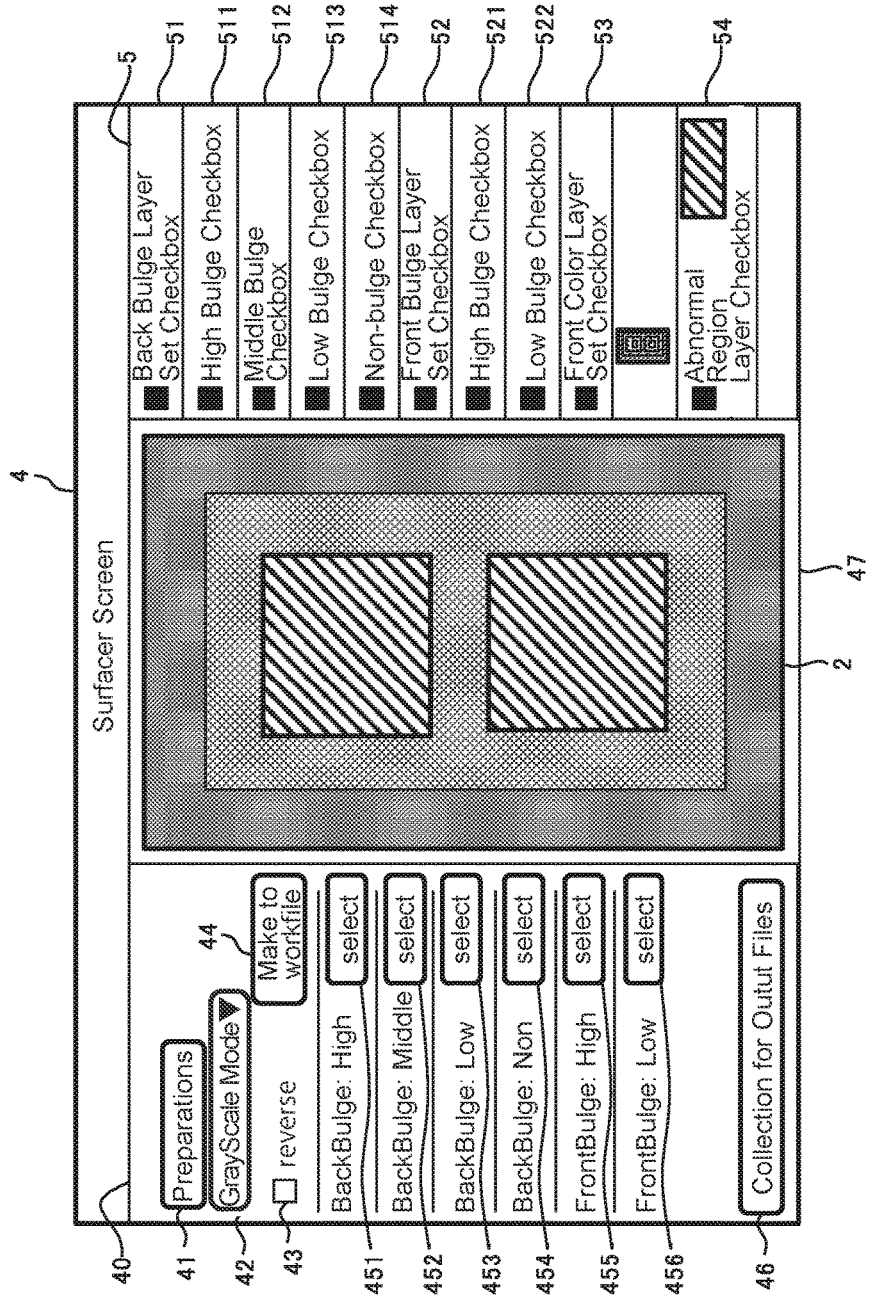
FIG. 8K is an example of the surfacer screen in which an abnormal region layer of the front bulge layer set is displayed.

FIG. 8K is an example of the surfacer screen 4 in which respective layers are displayed in the layer pane 5.

In the surfacer screen 4 illustrated in FIG. 8K, the front color layer 27 is displayed in the image pane 47. In the layer pane 5 arranged on the right side of the image pane 47, the back bulge layer set checkbox 51, the front bulge layer set checkbox 52, and the front color layer set checkbox 53 are displayed. The back bulge layer set checkbox 51 is used to display back bulge layers in the image pane 47. The front bulge layer set checkbox 52 is used to display front bulge layers in the image pane 47. The front color layer set checkbox 53 is used to display the front color layer 27 in the image pane 47. The abnormal region layer checkbox 54 is used to display the abnormal region layer 28 in the image pane 47. In FIG. 8K, all of the checkboxes included in the layer pane 5 are in the selected state. Below the front color layer set checkbox 53, a thumbnail of the front color layer 27 is displayed.

Thus, all of the layers are displayed, and the abnormal region layer 28 is displayed in a prioritized manner, which makes it possible to accurately report which regions abnormal distension will occur in.

Figure 9:
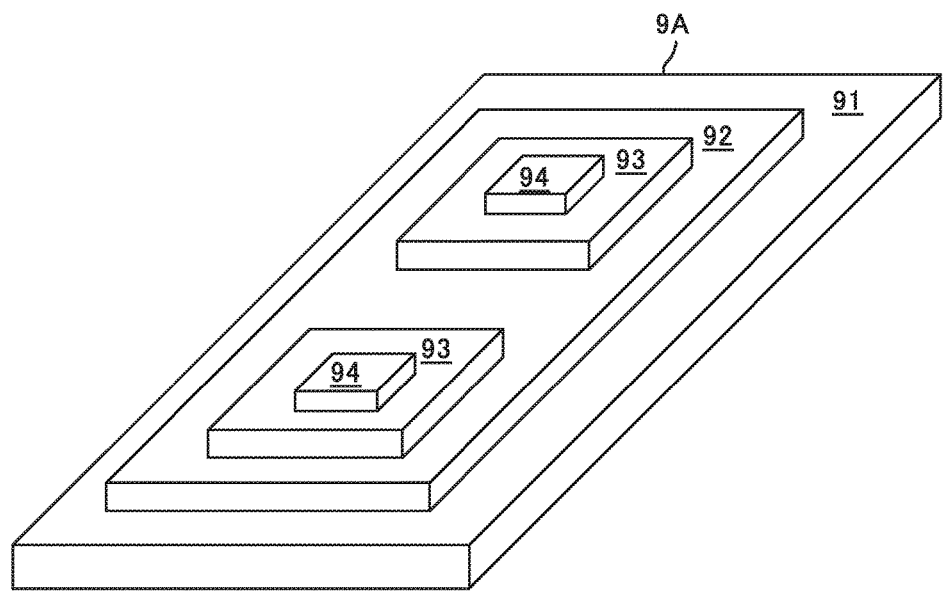
FIG. 9 is a perspective view illustrating an example of a three-dimensional image.

FIG. 9 is a perspective view illustrating an example of a three-dimensional image.

This three-dimensional image 9A is formed on the basis of the content 3 output from the surfacer screens 4 illustrated in FIGS. 8C to 8G. The three-dimensional image 9A is formed by printing the back bulge data on the rear surface of a thermally distensible sheet and then irradiating the rear surface of the thermally distensible sheet with light.

In the three-dimensional image 9A, a non-bulge region 91 corresponds to the non-bulge layer 24 illustrated in FIG. 8C. A low bulge region 92 corresponds to the low bulge layer 23 illustrated in FIG. 8C. A middle bulge region 93 corresponds to the middle bulge layer 22 illustrated in FIG. 8C. A high bulge region 94 corresponds to the high bulge layer 21 illustrated in FIG. 8C. In other words, the three-dimensional image 9A protrudes to different heights corresponding to the densities of respective layers. Note that here, the color data 33 is not illustrated.

Figure 10:
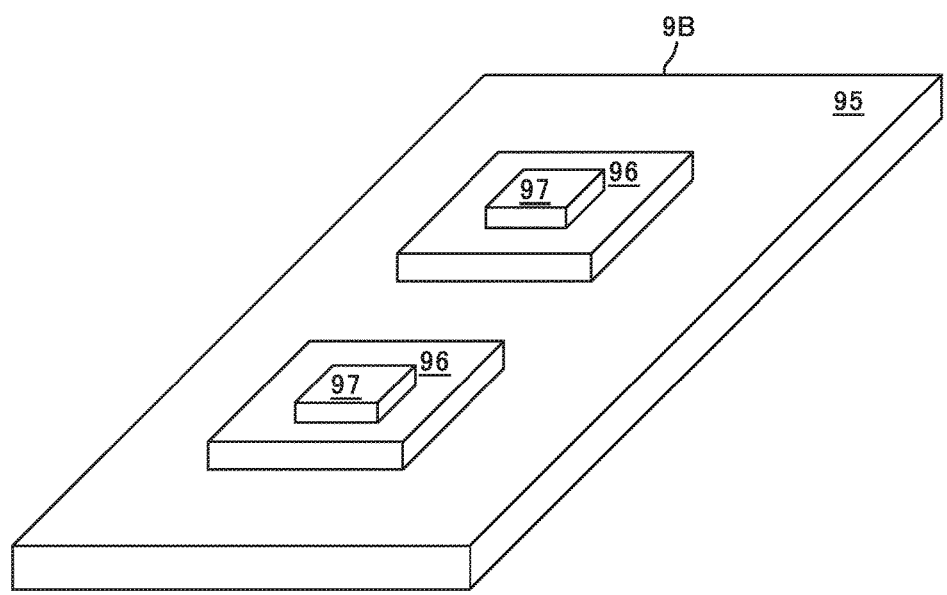
FIG. 10 is a perspective view illustrating another example of a three-dimensional image.

FIG. 10 is a perspective view illustrating another example of a three-dimensional image.

This three-dimensional image 9B is formed on the basis of the content 3 output from the surfacer screens 4 illustrated in FIGS. 8H to 8J. The three-dimensional image 9B is formed by printing the front bulge data (front foaming data) on the front surface of the thermally distensible sheet and then irradiating the front surface of the thermally distensible sheet with light.

In the three-dimensional image 9B, a non-bulge region 95 corresponds to the non-bulge layer 24 illustrated in FIG. 8H. A low bulge region 96 corresponds to the low bulge layer 26 illustrated in FIG. 8H. A high bulge region 97 corresponds to the high bulge layer 25 illustrated in FIG. 8H. In other words, the three-dimensional image 9B protrudes to different heights corresponding to the densities of respective layers. Note that here, the color data 33 is not illustrated.

The CPU 11 of the present embodiment functions as a layer image obtaining unit that divides image data including prescribed gradation levels into four layers on the basis of gradation values at each coordinate in order to obtain four layer images corresponding to different respective distension heights as first distension data for making a thermally distensible layer distend from one surface of a thermally distensible sheet including the thermally distensible layer. The CPU 11 also functions as a moving unit that moves at least one region in a prescribed layer image selected from among the plurality of layer images to second distension data for making the thermally distensible layer distend from the other surface of the thermally distensible sheet.

The CPU 11 functions as an allocation unit that allocates the image data including the prescribed gradation levels into a plurality of density layers that distend to different respective distension heights. The CPU 11 also functions as a data creation unit that creates distension data from the plurality of density layers. The CPU 11 functions as a changing unit that changes a prescribed region in a first density layer among the plurality of density layers to a second density layer. The data creation unit creates, from any region in distension data to be printed on a rear surface of the thermally distensible sheet, distension data to be printed on a front surface of the thermally distensible sheet.

Figure 11:
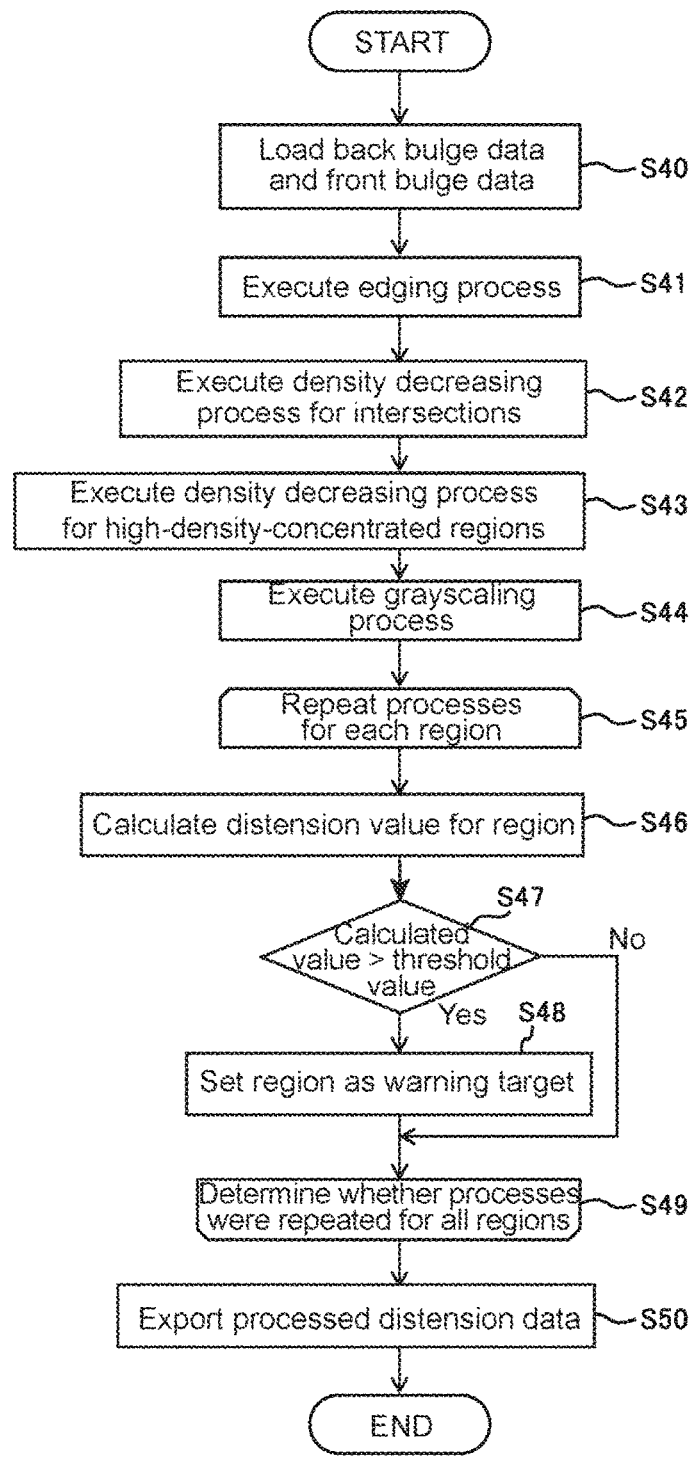
FIG. 11 is a flowchart illustrating a process for the optimizer.

FIG. 11 is a flowchart illustrating a process for the optimizer 172 and will be described with references to FIGS. 1 and 3 as appropriate.

The optimizer 172 process illustrated in FIG. 11 begins when the user launches the optimizer 172 on the user terminal 1 and inputs a command to optimize the original content 3A (see FIG. 3).

The CPU 11 loads the back bulge data 31 and the front bulge data 32 from the original content 3A that has been input (step S40) and then executes an edging process for high density regions in the back bulge data 31 (step S41). In this edging process, the CPU 11 further increases the density of the edges of the high density regions. This makes it possible to clearly define the edges of the protrusion regions that will distend from these high density regions.

The CPU 11 executes a density decreasing process for intersections (step S42). In this density decreasing process for intersections, the CPU 11 decreases the density of intersections between high density lines in the back bulge data 31 and the front bulge data 32. This makes it possible to prevent abnormal distension at such intersections. Here, the CPU 11 functions as the replacing unit that replaces data for regions for which the thermally distensible layer is predicted to distend abnormally with data that will not cause the thermally distensible layer to distend abnormally.

Next, the CPU 11 executes a density decreasing process for high-density-concentrated regions (step S43). In this density decreasing process for high-density-concentrated regions, the CPU 11 decreases the density of high-density-concentrated regions in the back bulge data 31 and the front bulge data 32. This makes it possible to prevent abnormal distension in such high-density-concentrated regions. Here, the CPU 11 functions as the replacing unit that replaces data for regions for which the thermally distensible layer is predicted to distend abnormally with data that will not cause the thermally distensible layer to distend abnormally.

The processes in steps S41 to S43 are optimization processes for the 2.5D printer system 7. After completing these optimization processes, the CPU 11 executes a grayscaling process (step S44). In this grayscaling process, the CPU 11 performs the density conversion illustrated in the graph in FIG. 12.

The back bulge data 31 and the front bulge data 32 in the original content 3A are provided with density values for a thermally distensible sheet having ideal properties. Here, "ideal properties" refers to properties that exhibit a perfect correspondence between density and distension height, for example, such as the properties with which a density of X % yields a distension height of X %.

However, in an actual thermally distensible sheet, the distension height becomes saturated when the density exceeds a first prescribed value, and no distension occurs when the density is less than a second prescribed value. Moreover, between this first prescribed value and second prescribed value, the relationship between density and distension height is non-linear. If the back bulge data 31 and the front bulge data 32 in the original content 3A were to be printed on the thermally distensible sheet and irradiated with light, the three-dimensional object formed would have distension heights different from those envisioned during content creation. Therefore, the CPU 11 converts the densities that assume ideal properties to densities corresponding to the properties of the actual thermally distensible sheet. Thus, when the converted distension data is printed on the thermally distensible sheet and irradiated with light, the three-dimensional object formed will have the distension heights envisioned during content creation.

After the grayscaling process, the CPU 11 repeats the processes in steps S45 to S49 for each region. Here, the CPU 11 functions as an identification unit that, on the basis of bump data, identifies regions for which it is predicted that the thermally distensible layer will distend abnormally. Moreover, "regions" refers to regions divided into a grid pattern in the planar direction.

The CPU 11 calculates a distension value for a given region (step S46). This calculated distension value is obtained by adding a density integral of the back bulge data 31 for the region to a value obtained by multiplying a density integral of the front bulge data 32 for the region by a prescribed coefficient. The prescribed coefficient is a value obtained by dividing a distension amount determined by the distension data for the front surface side by a distension amount determined by the distension data for the rear surface side.

If the calculated distension value exceeds a threshold value (Yes in step S47), the CPU 11 sets the region as a warning target (step S48). It is because when the calculated distension value exceeds this threshold value, the thermally distensible layer in the region is expected to distend abnormally. If the calculated distension value does not exceed the threshold value (No in step S47), the CPU 11 proceeds to the process in step S49.

In step S49, the CPU 11 determines whether the processes in steps S45 to S49 have been repeated for all of the regions. If there are any unprocessed regions, the CPU 11 returns to step S45 and repeats the processes.

In step S50, the CPU 11 exports the processed distension data as the content 3B (see FIG. 3). In other words, the optimized back bulge data 31 is exported as the back bulge data 34, and the optimized front bulge data 32 is exported as the front bulge data 35. Moreover, the CPU 11 exports the color data 33 as the color data 36 and writes the determination results from steps S47 and S48 to the warning data 37. Upon completing the process in step S50, the CPU 11 ends the process illustrated in FIG. 11.

Figure 12:
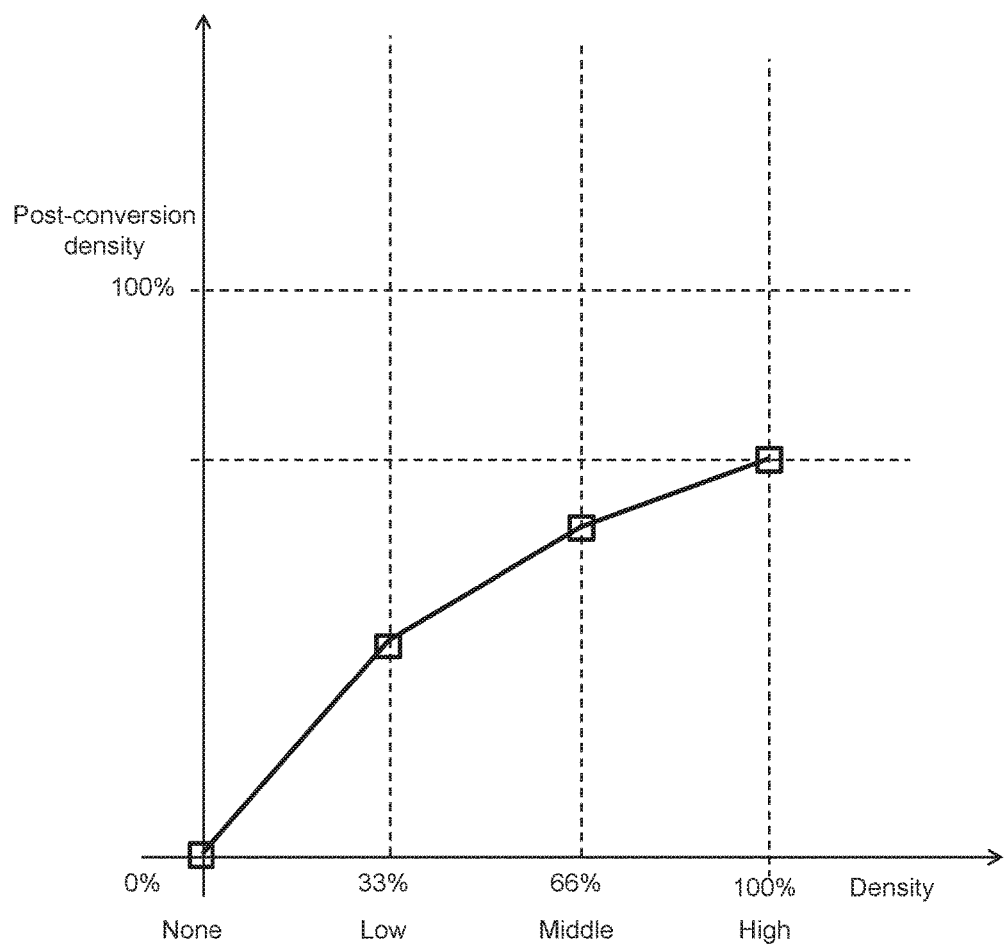
FIG. 12 is a graph showing a filtering conversion for optimizing for a thermally distensible sheet.

FIG. 12 is a graph showing a filtering conversion for optimizing for a thermally distensible sheet.

The horizontal axis of the graph represents the density of the distension data in the original content 3A. The vertical axis of the graph represents the density of the distension data in the content 3B after the filtering conversion. Here, a density of 0% corresponds to no distension, a density of 33% corresponds to low distension, a density of 66% corresponds to medium distension, and a density of 100% corresponds to high distension. In the thermally distensible sheet of the present embodiment, the distension height is saturated at a density of 70% in the distension data, and the relationship between density and distension height is non-linear, thereby yielding this graph.

Figure 13:
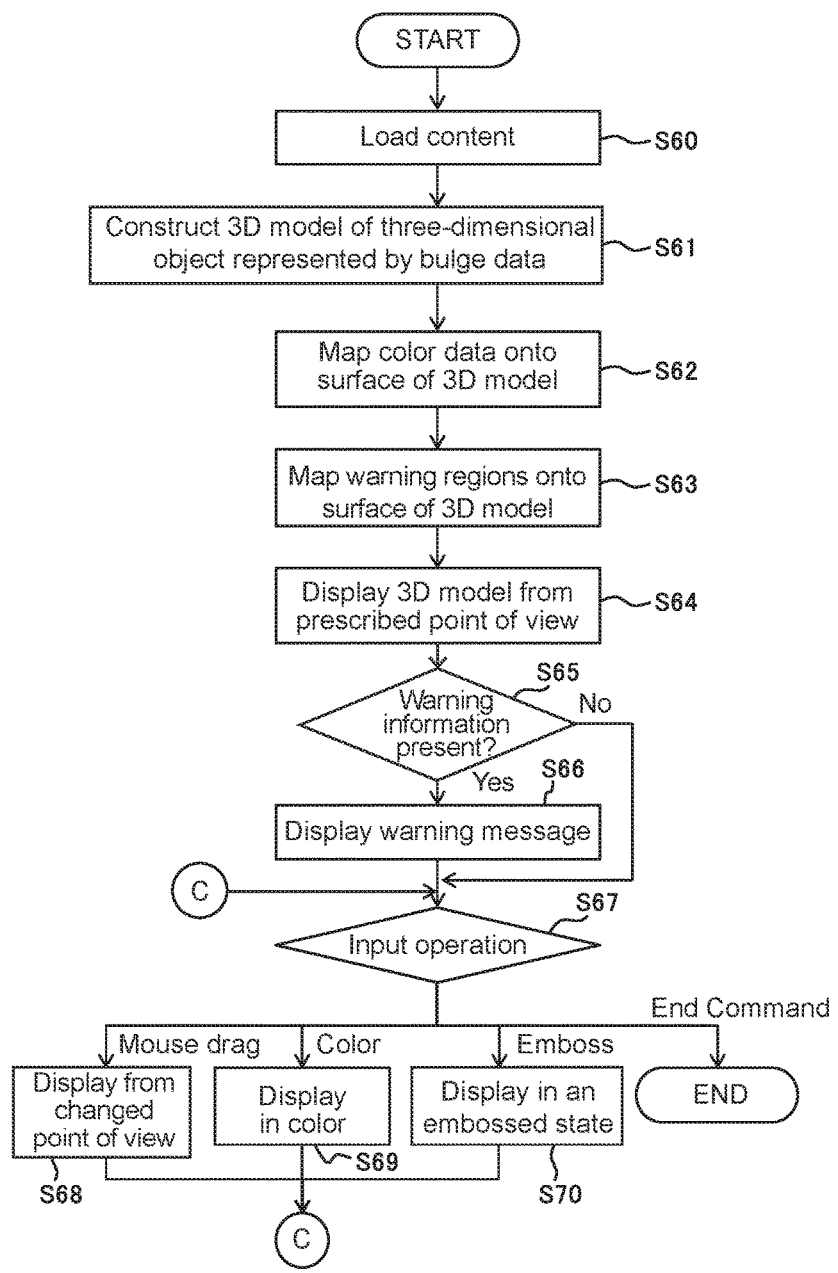
FIG. 13 is a flowchart illustrating a process for the viewer.

FIG. 13 is a flowchart illustrating a process for the viewer 173.

The viewer 173 process illustrated in FIG. 13 begins when the user launches the viewer 173 on the user terminal 1 and specifies content 3B (see FIG. 3).

The CPU 11 loads the specified content 3B (step S60). As illustrated in FIG. 3, the content 3B includes the back bulge data 34 (first distension data) for making the thermally distensible layer distend from the rear surface of the thermally distensible sheet as well as the front bulge data 35 (second distension data) for making the thermally distensible layer distend from the front surface of the thermally distensible sheet. The CPU 11 retrieves the back bulge data 34 and the front bulge data 35 as bump data.

The CPU 11 uses a 3D rendering engine to construct (render) a three-dimensional model (3D model) of the three-dimensional object based on the back bulge data 34 and the front bulge data 35 (step S61). Here, "3D rendering engine" refers to OpenGL (registered trademark) or DirectX (registered trademark), for example.

The CPU 11 maps the color data 36 onto the surface of the constructed 3D model (step S62) and also maps warning regions on the basis of the warning data 37 (step S63). The CPU 11 instructs the 3D rendering engine to display a preview of the 3D model from a prescribed point of view (step S64). As a result, a viewer screen 6A illustrated in FIG. 14 or a viewer screen 6B illustrated in FIG. 15 is displayed, for example. In the viewer screen 6B illustrated in FIG. 15, the warning regions mapped in step S63 are indicated by the hatching.

The CPU 11 determines whether any warning information is included in the warning data 37 (step S65). If warning information is present (Yes in step S65), the CPU 11 displays a warning message 62 (step S66). This warning message 62 is displayed on the viewer screen 6B illustrated in FIG. 15, for example.

After executing the sequence of processes in steps S61 to S66, the user terminal 1 begins waiting for input operations (step S67).

Upon detecting a mouse drag input operation, the CPU 11 proceeds to step S68 and instructs the 3D rendering engine to display the 3D model from a changed point of view, and then returns to step S67. In this way, the CPU 11 makes it possible to display the 3D model from the changed point of view.

Upon detecting a "Color" input operation, the CPU 11 proceeds to step S69 and instructs the 3D rendering engine to display the 3D model in color, and then returns to step S67. Moreover, upon detecting an "Emboss" input operation, the CPU 11 proceeds to step S70 and instructs the 3D rendering engine to display the 3D model in an embossed state, and then returns to step S67. Upon receiving the embossed display instruction, the 3D rendering engine displays the 3D model in an embossed state. This makes it possible to clearly display the protrusions and recesses in the three-dimensional object.

Upon detecting an "End Command" input operation, the CPU 11 ends the process illustrated in FIG. 13. This viewer 173 process allows the user to check the protrusions and recesses in the three-dimensional object content without having to test-print the content. Therefore, the user can quickly create content for forming three-dimensional objects.

Figure 14:
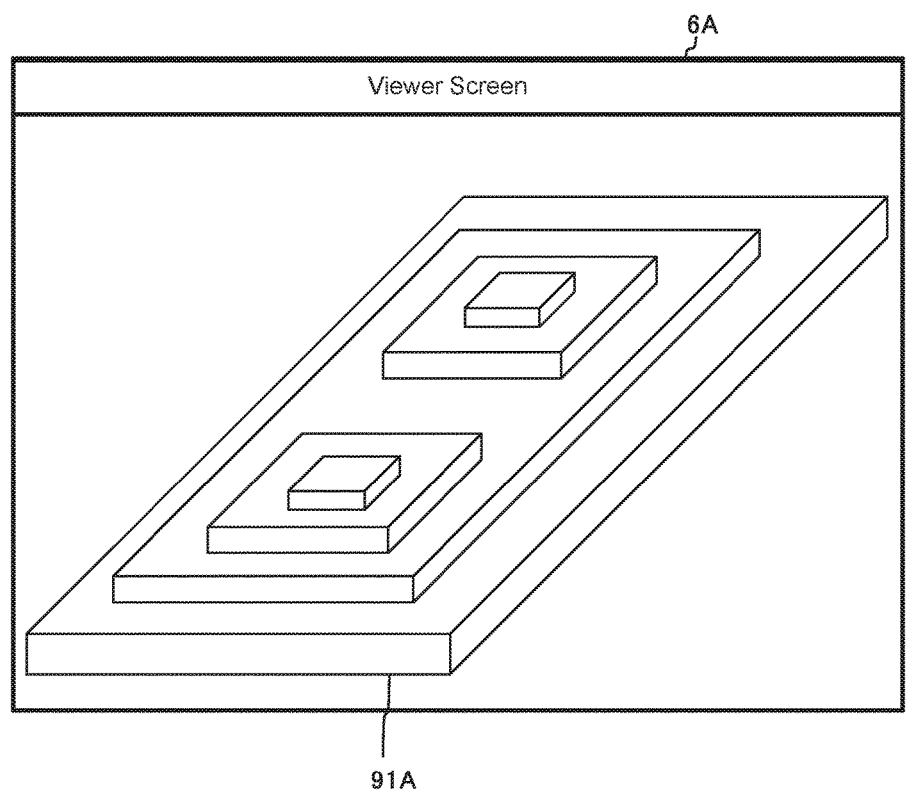
FIG. 14 illustrates an example of a screen in the viewer.
Figure 15:
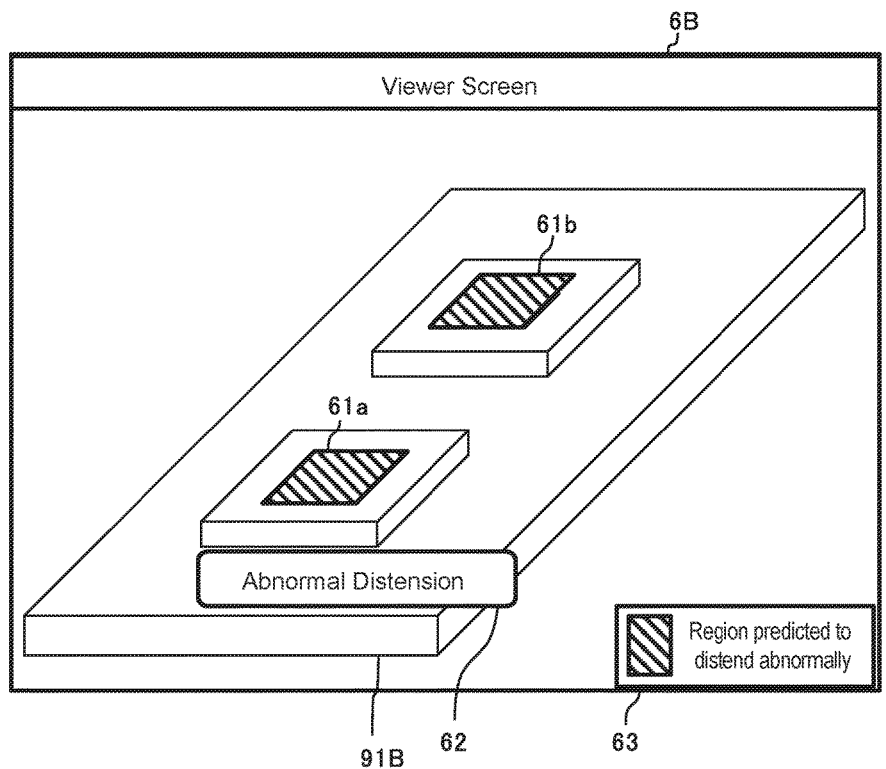
FIG. 15 illustrates an example of a warning-related screen in the viewer.

FIG. 14 illustrates an example of a screen in the viewer 173.

In this viewer screen 6A, a preview of the appearance of a three-dimensional object 91A is displayed from a point of view in a perspective direction. This three-dimensional object 91A has a substantially rectangular sheet-shape in which two protrusions are formed.

FIG. 15 illustrates an example of a warning-displaying screen in the viewer 173.

In this viewer screen 6B, a preview of the appearance of a three-dimensional object 91B is displayed from a point of view in a perspective direction. This three-dimensional object 91B has a substantially rectangular sheet-shape in which two protrusions are formed.

In the viewer screen 6B, an "Abnormal distension" warning message 62 is displayed. This warning message 62 allows the user to detect that the three-dimensional object content will distend abnormally without having to test-print the content. Furthermore, a legend 63 is displayed in the lower right of the viewer screen 6B. This legend 63 includes a color for warning regions 61a and 61b as well as a "Region predicted to distend abnormally" message.

In addition, in the viewer screen 6B, the warning regions 61a and 61b are displayed in a complementary color. The warning regions 61a and 61b are regions for which it is predicted that the thermally distensible layer will distend abnormally. The meaning of the complementary color for the warning regions 61a and 61b is indicated by the message in the legend 63. Therefore, these warning regions 61a and 61b as well as the legend 63 allow the user to detect that the regions where the three-dimensional object content will distend abnormally without having to test-print the content.

The warning regions 61a and 61b are not limited to being displayed in a complementary color and may be displayed in any manner that makes it possible to identify these regions as warning regions. For example, the warning regions 61a and 61b may be displayed using a prescribed color (such as red), using a prescribed hatching, using a prescribed flashing pattern, or using a combination of these.

Figure 16:
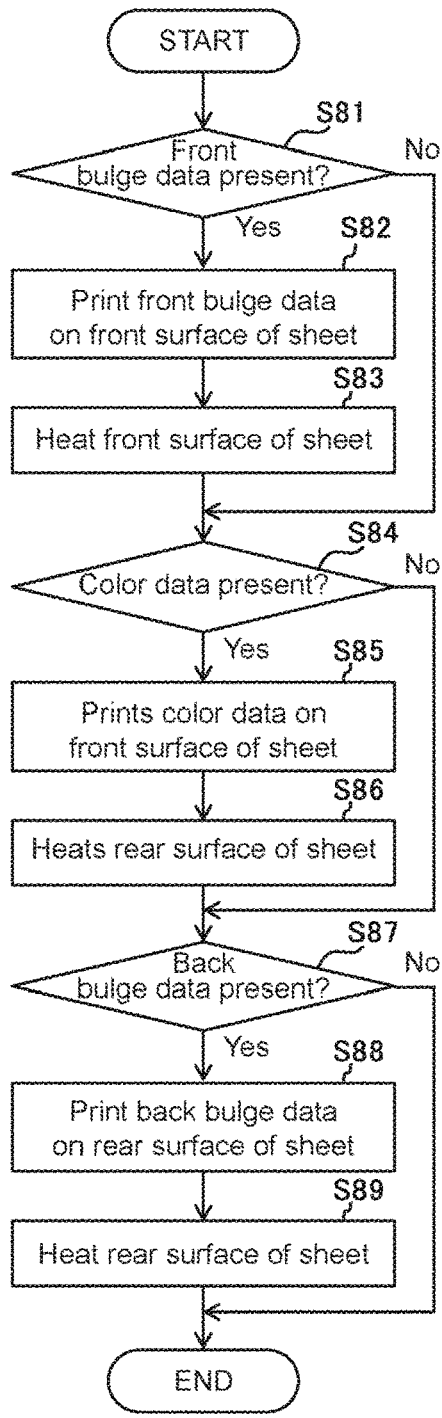
FIG. 16 is a flowchart illustrating a process for the 2.5D printer system.

FIG. 16 is a flowchart illustrating a process for the 2.5D printer system 7 and will be described with references to FIGS. 1 and 3 as appropriate.

The process illustrated in FIG. 16 begins when the user commands the 2.5D printer system 7 (see FIG. 1) to print the content 3B (see FIG. 3).

Figure 17:
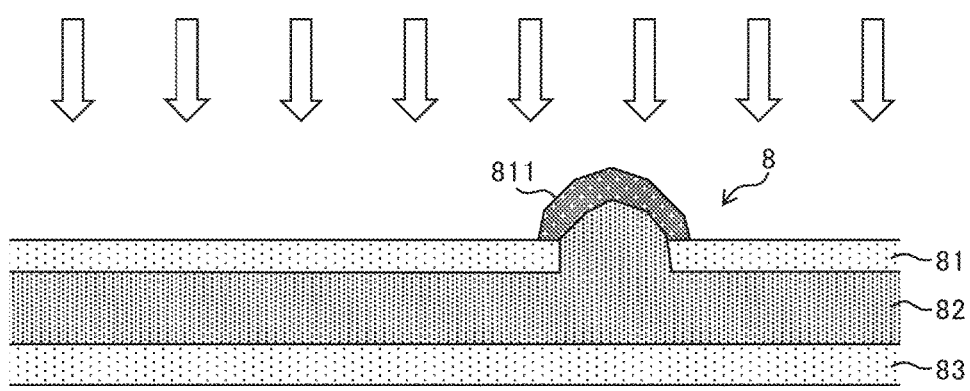
FIG. 17 is a cross-sectional view illustrating heating the front surface side of the thermally distensible sheet to induce distension (foaming).

First, the CPU 721 of the computer 72 determines whether the content 3B includes any front bulge data 35 (step S81). If front bulge data 35 is present (Yes in step S81), the CPU 721 prints the front bulge data 35 on the front surface of a thermally distensible sheet (step S82) and then heats the front surface of this thermally distensible sheet (step S83). As a result, a thermally distensible sheet 8 is formed as illustrated in FIG. 17 (described later). If no front bulge data 35 is present (No in step S81), the CPU 721 proceeds to the process in step S84.

Figure 18:
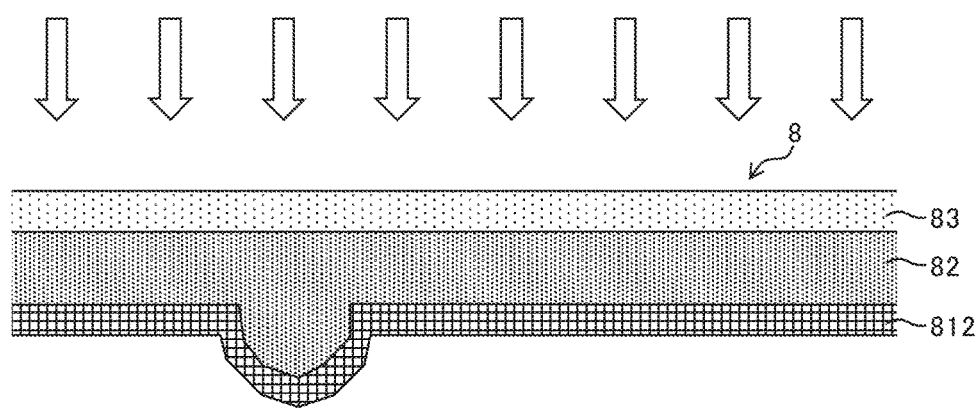
FIG. 18 is a cross-sectional view illustrating heating the rear surface side of the thermally distensible sheet to facilitate drying.

Next, the CPU 721 determines whether the content 3B includes any color data 36 (step S84). If color data 36 is present (Yes in step S84), the CPU 721 prints the color data 36 on the front surface of the thermally distensible sheet (step S85). As a result, the thermally distensible sheet 8 is formed as illustrated in FIG. 18 (described later). Then, the CPU 721 heats the rear surface of the thermally distensible sheet (step S86). This dries the thermally distensible sheet and makes it possible to achieve the desired distension heights when back bulge data is heated later.

If no color data 36 is present (No in step S84), the CPU 721 proceeds to the process in step S87.

Figure 19:
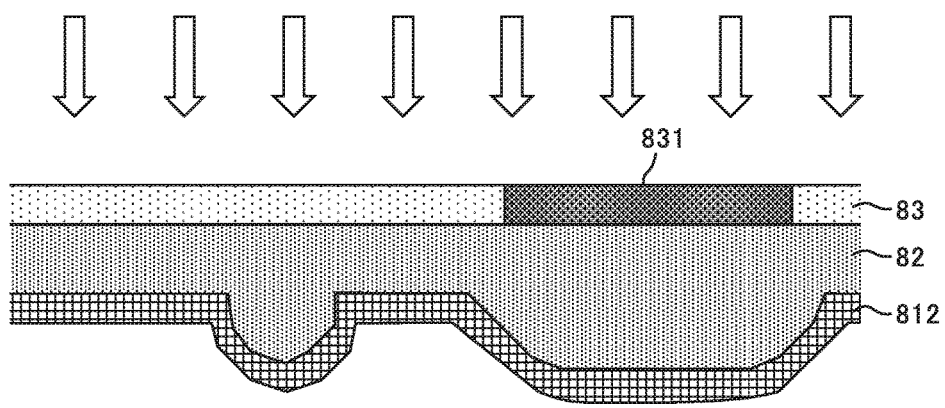
FIG. 19 is a cross-sectional view illustrating heating the rear surface side of the thermally distensible sheet to induce distension (foaming).

Next, the CPU 721 determines whether the content 3B includes any back bulge data 34 (step S87). If back bulge data 34 is present (Yes in step S87), the CPU 721 prints the back bulge data 34 on the rear surface of the thermally distensible sheet (step S88), heats the rear surface of the thermally distensible sheet (step S89), and then ends the process illustrated in FIG. 16. As a result, the thermally distensible sheet 8 is formed as illustrated in FIG. 19 (described later).

If no back bulge data 34 is present (No in step S87), the CPU 721 ends the process illustrated in FIG. 16.

The 2.5D printer system 7 uses a special type of paper that distends when heat is applied. The distension data is printed in densities of C (carbon), and a combination of printing in grayscale on the front side and printing in grayscale on the rear side makes it possible to express various protrusions and recesses. The examples illustrated in FIGS. 17 to 19 correspond to a six-pass example.

FIG. 17 is a cross-sectional view of, after printing distension data on the front surface side (inkjet layer 81 side) of the thermally distensible sheet 8, heating the front surface side to induce distension.

In the thermally distensible sheet 8 illustrated in FIG. 17, a thermally distensible layer 82 and the inkjet layer 81 are layered in order onto a base paper 83. In the thermally distensible layer 82, a plurality of thermally distensible materials (thermally distensible microcapsules or micropowders) are dispersed in a binder. The inkjet layer 81 is a layer for accepting ink. In the present embodiment, the "front surface side" of the thermally distensible sheet 8 refers to the inkjet layer 81 side, and the "rear surface side" refers to the base paper 83 side.

A grayscale-printed region 811 is printed on a region of the inkjet layer 81. The thermally distensible sheet 8 is an example of a medium that has undergone a front surface distension data (front surface foaming data) printing process and a front surface heating process in the 2.5D printer system 7.

The grayscale-printed region 811 is a layer printed with ink containing carbon black, for example, and converts visible light or near-infrared light (electromagnetic waves) to heat. When this grayscale-printed region 811 is irradiated with visible light or near-infrared light (electromagnetic waves), these electromagnetic waves are converted to heat, which causes the nearby thermally distensible layer 82 to thermally distend (thermally foam). This results in formation of a protrusion region.

The thermally distensible layer 82 is a layer that distends to a size corresponding to the heating temperature and the heating duration and in which a plurality of thermally distensible materials (thermally distensible microcapsules or micropowders) are dispersed in a binder. In the present embodiment, the grayscale-printed region 811 that converts electromagnetic waves to heat is formed on the top surface (front surface) of the base paper 83 and/or on the bottom surface (rear surface) of the base paper 83 and then irradiated with light in order to make the regions where the grayscale-printed region 811 is formed generate heat. The electromagnetic wave heat conversion layer heats up when irradiated with electromagnetic waves.

FIG. 18 is a cross-sectional view of, after printing color data on the front surface side of the thermally distensible sheet 8, heating the rear surface side to facilitate drying.

In the thermally distensible sheet 8 illustrated in FIG. 18, the two sides of the sheet are flipped relative to in the thermally distensible sheet 8 illustrated in FIG. 17. Therefore, the base paper 83 on the rear surface side of the thermally distensible sheet 8 is on the uppermost side, and the thermally distensible layer 82 and the inkjet layer 81 are layered in order therebeneath.

Here, nothing has been printed on the base paper 83, and therefore the rear surface side of the thermally distensible sheet 8 remains white. Meanwhile, color data has been printed on many of the regions of the inkjet layer 81, thereby forming a color-printed region 812. When color data is printed over a wide area in this manner, the thermally distensible sheet 8 becomes wet due to the CMY ink. If, in this state, a distension image (foaming image) were to be printed on the rear surface and then irradiated with visible light or near-infrared light (electromagnetic waves), due to the heat of vaporization of the ink, the thermally distensible layer 82 would not reach the desired temperature and would be unable to achieve sufficient distension height.

Therefore, in the present embodiment, the base paper 83 side is irradiated with visible light or near-infrared light (electromagnetic waves). The base paper 83 is white and therefore converts a portion of these electromagnetic waves to heat but does so without causing thermal distension of the nearby thermally distensible layer 82. The 2.5D printer system 7 heats the thermally distensible sheet 8 by irradiating the rear surface side with light and thereby makes it possible to dry the color-printed region 812.

FIG. 19 is a cross-sectional view of, after printing distension data on the rear surface side of the thermally distensible sheet 8, heating the rear surface side to induce distension.

In the thermally distensible sheet 8 illustrated in FIG. 19, the base paper 83 on the rear surface side is on the uppermost side, and the thermally distensible layer 82 and the inkjet layer 81 are layered in order therebeneath. In the thermally distensible sheet 8 illustrated in FIG. 19, a grayscale-printed region 831 is formed on a region of the base paper 83. This grayscale-printed region 831 is a layer printed with ink containing carbon black, for example, and converts visible light or near-infrared light (electromagnetic waves) to heat.

In the present embodiment, after the distension data is printed on the rear surface side, the rear surface side is heated by being irradiated with light, which causes the thermally distensible layer 82 near the grayscale-printed region 831 to thermally distend. Moreover, the printed region on the rear surface side is small in area compared to the printed region of the color data on the front surface side, and therefore decreases in temperature due to the heat of vaporization of the ink are also small.

Modification Examples

The present invention is not limited to the embodiment described above, and various modifications can be made without departing from the spirit of the present invention. For example, modifications such as (a) to (h) below are possible.

(a) The optimization processes performed by the optimizer 172 are not limited to the edging process or the density decreasing processes for intersections and high-density-concentrated regions, and may include any processes.

(b) In the present embodiment, the optimizer 172 and the viewer 173 are provided as separate software programs. However, the optimizer 172 and the viewer 173 may be provided as a single software program having the features of both, and are not limited to these examples.

(c) The viewer 173 displays the warning regions 61a and 61b in a complementary color. However, the manner of display is not limited to this example and these regions may be displayed using any color, brightness, or pattern, or in any other manner.

(d) The back bulge layers are not limited to being four layers, and the front bulge layers are not limited to being two layers.

(e) The method of allocating the image data into the back bulge layers is not limited to being based on brightness (gradation). For example, the image data may be allocated on the basis of whether prescribed color or brightness (gradation) values are included.

(f) The allocating destinations for the image data are not limited to being the back bulge layers, and the image data may initially be allocated into the front bulge layers.

(g) The content 3 created by the surfacer 171 does not necessarily need to include all of the back bulge data 31, the front bulge data 32, and the color data 33. The content 3 may include just the back bulge data 31 and the color data 33, just the front bulge data 32 and the color data 33, or just the back bulge data 31 and the front bulge data 32, and is not limited to these examples.

(h) The content 3 created by the surfacer 171 is not limited to being used for surface materials and may be used for any purpose.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A three-dimensional image data reviewing device, comprising:
a processor that obtains first distension data for causing a thermally distensible layer of a thermally distensible sheet to distend from one of a front surface and a rear surface of the thermally distensible sheet and that obtains second distension data for causing the thermally distensible layer to distend from another of the front surface and the rear surface of the thermally distensible sheet, and
a display unit connected to the processor,
wherein the processor causes the display unit to display, on a preview screen, an appearance of the thermally distensible sheet after the thermally distensible layer is caused to distend in accordance with the first distension data and the second distension data, the processor also causing the display unit to identifiably display, in a prescribed manner, an abnormal region of the thermally distensible layer where the thermally distensible layer is predicted to distend abnormally.

2. The three-dimensional image data reviewing device according to claim 1, wherein the processor identifies the abnormal region where the thermally distensible layer is predicted to distend abnormally on the basis of the first distension data and the second distension data that were obtained.

3. The three-dimensional image data reviewing device according to claim 2, wherein, for each of a plurality of predefined divided regions of an image to be printed on the thermally distensible sheet, the processor calculates a distension value by adding an integrated image density value of the second distension data for the divided region to a value obtained by multiplying an integrated image density value of the first distension data for the divided region by a prescribed coefficient, and when the calculated distension value for the region exceeds a threshold value, the processor identifies said region as the abnormal region where the thermally distensible layer is predicted to distend abnormally,
where the prescribed coefficient is a ratio of a distension amount by which the thermally distensible layer would distend by the first distension data to a distension amount by which the thermally distensible layer would distend by the second distension data.

4. The three-dimensional image data reviewing device according to claim 2, wherein, for the abnormal region, the processor modifies at least one of the first distension data and the second distension data for the abnormal region so that the thermally distensible layer will not distend abnormally.

5. The three-dimensional image data reviewing device according to claim 4, wherein the processor reduces an image density of said at least one of the first distension data and the second distension data for the abnormal region so that the thermally distensible layer will not distend abnormally.

6. The three-dimensional image data reviewing device according to claim 1, wherein the processor causes the display unit to display the abnormal region where the distension layer is predicted to distend abnormally with color, hatching, or a flashing pattern.

7. The three-dimensional image data reviewing device according to claim 6, wherein the processor causes the display unit to display a three-dimensional model of the thermally distensible sheet that would be created after the thermally distensible layer is caused to distend in accordance with the first distension data and the second distension data, and maps the abnormal region on the three-dimensional model.

8. The three-dimensional image data reviewing device according to claim 2, wherein upon identifying the abnormal region where the distension layer is predicted to distend abnormally, the processor causes the display unit to display a warning message on the preview screen.

9. A three-dimensional image data creation device, comprising:
a processor that receives image data having prescribed gradation levels and allocates the image data into a plurality of density layers that, when printed on a thermally distensible sheet, respectively cause a thermally distensible layer of the thermally distensible sheet to distend to different respective distension heights, the processor generating distension data by combining the plurality of density layers and determining whether abnormal distension will occur in the thermally distensible sheet including the thermally distensible layer, the processor outputting the determination result.

10. The three-dimensional image data creation device according to claim 9, wherein the processor creates a layer that has a region for which the processor determined that abnormal distension will occur.

11. The three-dimensional image data creation device according to claim 9,
wherein the processor changes a prescribed region in a first density layer among the plurality of density layers to a second density layer so as to modify the plurality of density layers, and
wherein the processor reevaluates whether abnormal distension will occur for the modified plurality of density layers.

12. The three-dimensional image data creation device according to claim 11, wherein the plurality of density layers is fewer in number than the prescribed gradation levels of the image data.

13. A computer-readable non-transitory storage medium having stored thereon a program executable by a computer, the program causing the computer, which controls a three-dimensional image data creation device, to perform the following:
dividing image data having prescribed gradation levels into a plurality of density layers that, when printed on a thermally distensible sheet, respectively cause a thermally distensible layer of the thermally distensible sheet to distend from one of a front surface and a rear surface of the thermally distensible sheet to different respective distension heights, on the basis of gradation values at each pixel, the plurality of density layers being fewer in number than the prescribed gradation levels of the image data;
generating distention data by combining the plurality of density layers;
determining, from the distension data, whether abnormal distension will occur in the thermally distensible sheet having the thermally distensible layer;
moving at least one region of a density layer among the plurality of density layers to a density layer that causes the thermally distensible layer of the thermally distensible sheet to distend from another of the front surface and the rear surface of the thermally distensible sheet; and
thereafter, reevaluating whether the abnormal distension will occur.

14. The storage medium according to claim 13, wherein when it is determined in the determining that the abnormal distension will occur, a new density layer is created separate from the plurality of density layers.

* * * * *